United States Patent
Wang et al.

(10) Patent No.: US 11,055,793 B1
(45) Date of Patent: Jul. 6, 2021

(54) PREPARATION OF ELECTRONIC TAX RETURN WHEN ELECTRONIC TAX RETURN DATA IS REQUESTED BUT NOT PROVIDED BY TAXPAYER

(71) Applicant: INTUIT INC., Mountain View, CA (US)

(72) Inventors: Gang Wang, San Diego, CA (US); Jay J. Yu, Encinitas, CA (US); Matthew L. Sivertson, San Diego, CA (US); Dirk A. Reschly, Escondido, CA (US); Kevin M. McCluskey, Carlsbad, CA (US)

(73) Assignee: INTUIT INC., Mountain View, CA (US)

( * ) Notice: Subject to any disclaimer, the term of this patent is extended or adjusted under 35 U.S.C. 154(b) by 1286 days.

(21) Appl. No.: 14/814,385

(22) Filed: Jul. 30, 2015

(51) Int. Cl.
*G06Q 40/00* (2012.01)

(52) U.S. Cl.
CPC .................. *G06Q 40/123* (2013.12)

(58) Field of Classification Search
CPC ................................................... G06Q 40/123
USPC ..................................................... 705/31–42
See application file for complete search history.

(56) References Cited

U.S. PATENT DOCUMENTS

| | | | | |
|---|---|---|---|---|
| 7,797,216 B2 * | 9/2010 | Larsen | ................... | G06Q 40/06 705/36 R |
| 2006/0155618 A1 * | 7/2006 | Wyle | ..................... | G06F 17/243 705/31 |
| 2012/0109792 A1 * | 5/2012 | Eftekhari | ................ | G06F 21/31 705/31 |
| 2016/0042466 A1 * | 2/2016 | Herndon | ................ | G06Q 40/10 705/31 |
| 2016/0300310 A1 * | 10/2016 | Costanz | ............... | G06Q 40/123 |
| 2016/0323247 A1 * | 11/2016 | Stein | ...................... | G06Q 20/02 |

* cited by examiner

*Primary Examiner* — Bruce I Ebersman
*Assistant Examiner* — John A Anderson
(74) *Attorney, Agent, or Firm* — DLA Piper LLP (US)

(57) ABSTRACT

Modular computerized tax return preparation systems that allow tax data determinations to be performed when the user indicates that tax data will not be entered, which may be for various reasons including the user declining to provide personal information (such as a social security number or other personal identification information), not knowing the requested data, or not having the requested data readily available. A user interface controller presents an interview screen requesting data tax return data and the user responds that the requested data applies to the user but is not being entered or will be entered at a later time. A placeholder is generated or selected for interim use until the requested data is provided by the user, and when provided, tax data determinations and calculations can be repeated as necessary if the provided data differs from the placeholder.

33 Claims, 28 Drawing Sheets

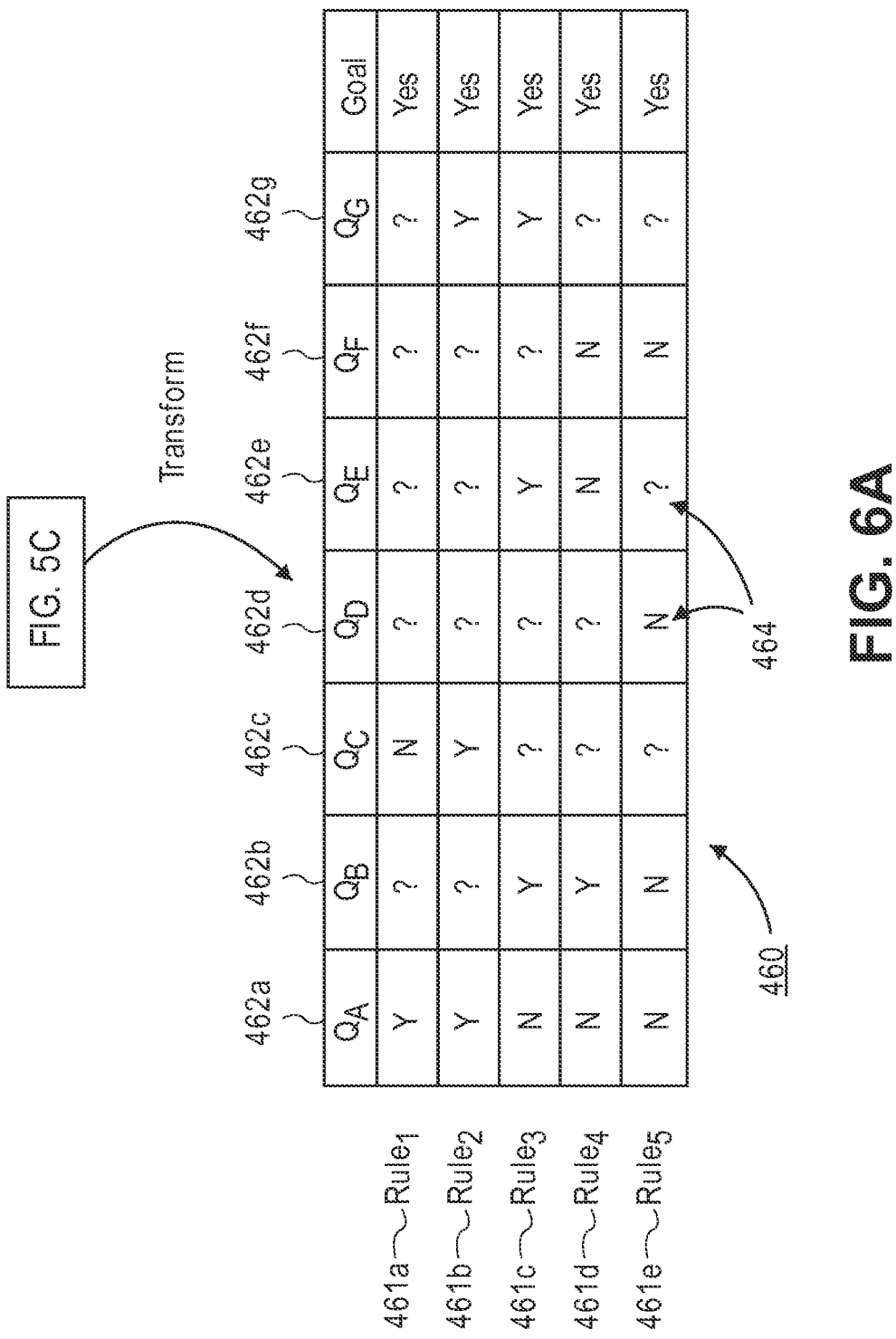

| | $Q_A$ | $Q_B$ | $Q_C$ | $Q_D$ | $Q_E$ | $Q_F$ | $Q_G$ | STAT1 | STAT2 |
|---|---|---|---|---|---|---|---|---|---|
| Rule₁ | Y | ? | ? | ? | N | ? | ? | 40% | 10% |
| Rule₂ | N | Y | Y | ? | ? | ? | N | 20% | 5% |
| Rule₃ | N | Y | N | Y | ? | N | ? | 14% | 6% |
| Rule₄ | Y | ? | ? | ? | N | Y | N | 65% | 20% |
| Rule₅ | N | Y | N | ? | ? | ? | Y | 18% | 40% |
| Rule₆ | Y | Y | N | ? | ? | N | ? | 5% | 25% |

FIG. 6B

| | A | B | C | D | E | F | G | Goal |
|---|---|---|---|---|---|---|---|---|
| R1 | Y | ? | N | ? | ? | ? | ? | Yes |
| R2 | Y | ? | Y | ? | ? | ? | Y | Yes |
| R3 | N | Y | ? | ? | Y | ? | Y | Yes |
| R4 | N | Y | ? | ? | N | N | ? | Yes |
| R5 | N | N | ? | N | ? | N | ? | Yes |

Rows (Rules 461)
Columns (Questions 462)

Cross Out Since Answer to Question A is "yes" 1010

PREPARATION OF ELECTRONIC TAX RETURN WHEN ELECTRONIC TAX RETURN DATA IS REQUESTED BUT NOT PROVIDED BY TAXPAYER

BACKGROUND

Millions of taxpayers have utilized tax return preparation applications such as TURBOTAX tax return preparation applications available from Intuit Inc. to prepare and file their tax returns. TURBOTAX is a registered trademark of Intuit Inc., Mountain View, Calif. Certain providers of tax preparation applications offer their tax return preparation products for free in order to allow the user to test the product or to allow the user to begin preparation of their tax returns and eventually purchase the tax return preparation product for finalizing the return and filing. In these cases, the user is not charged for use of the tax return preparation application until it is time to complete and file the tax return. While users are able to these tax return preparation applications, it is not uncommon for these users to begin but not complete their returns for various reasons, even when there is no charge to the user.

For example, as part of the interview process, a tax return preparation application may request certain information that the user does not want to provide at the current time, e.g., personal identification information or sensitive information such as a social security number, residence address, name, names of children or a spouse, etc. Given the manner in which current tax return preparation applications are structured, when requested data is not provided by the user, known systems operate on the basis that the data will not be entered and the associated type of data, topic or question do not apply. This rigidity and inflexibiltiy may result in inaccurate tax calculations as the user is preparing an electronic tax return as well as resulting in reduced customer confidence, leading to customer retention issues since users may become frustrated and stop using the program. In other words, given the particular manner in which known systems are structured, known systems are not configured to handle situations in which a user indicates that a certain topic or tax situation applies to the user, but the user declines to provide the requested information (e.g., if the data is sensitive or personal identification data), or when the user is not able to provide the requested data (e.g., the user does not have access to the requested data or a tax form including the requested data, or the user does not recall the requested data).

For example, by not indicating that the user is married or not providing a spouse name, known tax return preparation application system proceed on the basis that the user filing as "single" rather than "married and filing jointly," which can have substantial tax consequences. Further, by not providing a social security number, known tax return preparation application systems proceed on the basis that the user does not have a SSN and is thus not a U.S. citizen, and whether or not a SSN is entered can have significant tax consequences. As a further example, if a SSN of a spouse is not provided, the missing spouse's SSN may lead to a result that the user's filing status is "Single" rather than either "Married Filing Jointly" or "Head of Household," consequences of which may be thousands of dollars.

Given the resulting unexpected and inaccurate results, users may lose confidence in the tax return preparation system and leave the system, particularly if they are trying out the system on a trial basis, even though the system is operating correctly based on the currently provided information. Further, some tax return preparation applications, e.g., as generally illustrated in FIG. 23, may present an interview screen requesting information such as SSN and requiring the user to enter the SSN data in order to proceed. The system may generate a message 2302 indicating that the errors of unentered data 2301 (e.g., SSN in the illustrated example) must be fixed before the user can continue.

Thus, limitations of known tax return preparation applications stemming from the manner in which such known tax return preparation applications are structured may result in the inability or reduced ability to provide meaningful and accurate tax return preparation experiences or initial estimates, which may result in inaccurate and/or unexpected tax return estimates, customers terminating their current test or initial preparation prematurely and customer retention issues.

SUMMARY

Embodiments of the invention generally relate to tax return preparation systems that provide for execution of tax-related determinations based on certain data even when that tax data is not provided by the user.

Embodiments of the invention also generally relate to maintaining engagement of users of tax return preparation applications when users decline to provide data that is requested by the system, while at the same time, providing more accurate tax calculation results and estimates compared to known tax return preparation applications that would proceed on the basis that the data does not apply.

Certain embodiments of the invention are generally related to tax return preparation systems that provide for the ability of a user to indicate that a certain type or category of data applies to the user without requiring the user to enter the specific data, and executing tax calculations and determinations based on the user's indication without providing the actual data. For example, systems constructed according to embodiments allow a user to specify "Yes, I have a SSN" without actually providing the SSN, and the tax return preparation system proceeds with tax calculations and determinations based on the user having a SSN even though the user declined to enter the SSN into the electronic tax return.

One embodiment involves a computerized tax return preparation system that is executable by one or more processors of one or more computing devices for preparation and/or filing of an electronic tax return. One embodiment of a system includes a user interface controller, a data store, a special purpose temporary data engine, a calculation engine and a tax logic agent. With the modular configuration of system embodiments in which components can operate independently of each other, generation of interview screens by the user interface controller and rule analysis by the computerized tax logic agent regarding which topic or question to present to a user are independent of each other. According to embodiments, the user interface controller is configured or operable to present an interview screen to a user of the system that includes a request for data related to the electronic tax return being prepared. The user, for various reasons, may be hesitant, or not able, to provide the requested information. For example, the information may be a personal or sensitive nature (such as a name, social security number and other such data), or the user may not recall the requested information (e.g., a date of birth, which is used for age determinations and associated tax determinations). Further, the user may not know the requested information since the information is in a tax document that has not been received or the user does not have at the moment. Thus, in response to the system's request presented via an interview screen, the user indicates through the same or other interview screen, e.g., by selecting a displayed option, menu item or checking a box, which indicates that the requested data applies to the user, but the requested data is not being provided at the current time. The temporary data engine is configured or programmed to generate a placeholder for the unentered data, or the data that was requested and not provided by the user, based on the user's response, and this placeholder is written by the temporary data engine or the user interface controller to the data store. The calculation engine is configured or programmed to read from the data store the runtime data of the return including the placeholder, execute a function utilizing the runtime data, determine a result of the function, and write the determined result to the data store to update the runtime data. The tax logic agent is configured or programmed to read the runtime data as updated by the user interface controller and/or the calculation engine from the shared data store, which includes or is based at least in part upon the placeholder, perform analysis of rules based at least in part upon the updated runtime data, and generate a non-binding suggestion of an unanswered question or topic for consideration by the user interface controller.

Further embodiments involve computer-implemented methods for performing tax return determinations and calculations when a user declines to provide requested data. Embodiments may involve one or more or all of a user interface controller, a data store, a special purpose temporary data engine, a calculation engine and a tax logic agent.

Yet other embodiments involve computer program products or articles of manufacture comprising non-transitory computer readable medium tangibly embodying one or more sequences of instructions wherein execution of the one or more sequences of instructions by one or more processors contained in one or more computing systems causes the one or more computing systems to perform tax return determinations and calculations when a user declines to provide requested data, and to allow preparation of an electronic tax return to proceed without having actual data.

Further embodiments involve interfaces or interview screens, and sequences thereof, generated by a tax return preparation system that permit a user to indicate that certain topics are applicable to a user but that the user is not currently providing such data or such data is not currently known or available. The tax return preparation system proceeds with tax related determinations and calculations knowing that certain types or categories of data apply, without having the actual data itself.

In a single or multiple embodiments, when requested data is not provided by a user, for various reasons, a temporary data engine or a user interface controller including a temporary data engine generates a placeholder for the requested data, and the placeholder is written to the data store shared among other system components, and tax calculations and logic determinations are performed using the placeholder data. A placeholder may take various forms according to embodiments.

According to one embodiment, a placeholder is in the form of pseudodata, which can be generated or selected by the temporary data engine for the unentered data, or data that was requested but not provided, following the user's response that such data applies but is not being entered or is not available. One example of how pseudodata may be utilized is when the tax return preparation application generates an interview screen requesting the user's social security number (SSN), but the user provides a response that the SSN is not being entered. In such cases, the tax return preparation application may generate pseudodata, e.g., a pre-determined, temporary SSN such as 555-55-5555 or 123-45-6789 may be utilized for the user and/or other users. In other embodiments, a temporary SSN may be generated, e.g., by use of a random number generator. Thus, in this embodiment, the format of the pseudodata is the same as the format (e.g., in terms of the type of data, such as numerical data, as well as the configuration (e.g., xxx-xx-xxxx) of the requested but unentered data. Other system components, such as the calculation engine and the tax logic agent, proceed with performing their calculations/determinations utilizing the pseudodata and other data read from the shared data store.

In one or more embodiments in which pseudodata is utilized, the pseudodata may be written to the data by itself such that other system components may not be aware of its temporary status. In such embodiments, other system components proceed with logic determinations and tax calculations using the placeholder data as if the placeholder data was provided by the user and is not temporary data. In other words, the calculation engine and tax logic agent may not be aware of the temporary status of the pseudodata that they are processing. Thus, generation/selection and management of placeholders including pseudodata and status thereof may be managed by the user interface controller and/or temporary data engine independently of other system components. However, in other embodiments, a temporary data indicator, such as a tag, flag or bit that is associated with data in the shared data store, is written to the data store and associated with the pseudodata. Thus, when other system components such as the calculation engine and tax logic agent read runtime data, the other system components know that the pseudodata is temporary data and may be updated at a later time. Thus, when a calculation engine performs a calculation utilizing pseudodata, a calculation result can be tagged with the indicator to indicate that the result written to the data store is based on a temporary placeholder. Further, when the tax logic agent performs rule analysis and generates a non-binding suggestion of a topic or suggestion, the non-binding suggestion can also include an indicator that the non-binding suggestion is based on a temporary placeholder.

In a single or multiple embodiments, a placeholder is in the form of an indicator such as a tag, bit or flag (without pseudodata) to indicate that while data is not available for the type or category of data tagged or flagged in the data store such that tax calculations or logic determinations that involve that type of data can still be performed.

In a single or multiple embodiments, a tax return preparation application may make an educated guess, estimate or assumption regarding other tax return data based at least in part upon the placeholder or the reason that the placeholder was generated. For example, if the user is requested to provide a spouse's social security number, but declines to do so, the system can proceed on the basis that the taxpayer is married rather than single, and may make other predictions of tax data about the taxpayer based at least in part upon the placeholder data and other taxpayer data as applicable. For example, if the placeholder data indicates that the taxpayer has a social security number for a spouse, together with the taxpayer having a certain income level and living in a certain zip code, statistical data and/or a prediction mechanism may be used to determine the user is likely to have children or to have certain types of investment income. This predicted data may then be tagged, marked or identified as such and/or as being based on a temporary placeholder, and later presented to the user and verified or corrected as appropriate and/or utilized for other tax logic determinations/non-binding suggestions and calculations.

In a single or multiple embodiments, the user interface controller tracks placeholders for unentered data and determines whether an additional request should be presented to the user for the unentered data independently of a non-binding suggestion generated by the computerized tax logic agent. Thus, in these embodiments, the tax logic agent and the calculation engine read runtime data and placeholders without knowing or processing placeholders, whereas in other embodiments in which placeholder data in the shared data store is tagged with a temporary placeholder data indicator, the tax logic agent can include the tag or indicator in a non-binding suggestion to inform the user interface controller that the non-binding suggestion is based on a placeholder, and a result generated by the calculation engine can be tagged to indicate that the calculation or function involved temporary placeholder data.

In a single or multiple embodiments, the temporary data engine is a stand-alone, modular component that is in communication the user interface controller and/or shared data store, and may also be in communication with a source of statistical data or prediction mechanism in certain embodiments. In other embodiments, the temporary data engine is a component or module of the user interface controller.

Further, in a single or multiple embodiments, the tax return preparation system, may be a distributed tax return preparation system in which modular user interface controller, data store, tax logic agent and calculation engine components are hosted by respective computers such that the data store is shared by and in communication through respective networks with the user interface controller, data store and tax logic agent, and in such systems, a user computer may communicate and interact with the computer hosting the user interface controller but not other system components or computers. Such systems may be particularly suitable for on-line tax return preparation applications that are accessible by a user through a browser executing on a user's computing device.

According to one or more embodiments, the calculation engine and the tax logic agent utilize graphical data structures. The calculation engine may utilize a directed calculation graph having encoded data dependencies amongst tax concepts or topics, input or leaf nodes comprising data for specific tax-related items, tax function nodes and result nodes. The tax logic agent utilizes a directed completeness graph indicating when the electronic tax return is a fileable tax return.

Given various aspects of embodiments and how embodiments may be implemented, embodiments provide improvements to various technical fields and aspects, utilization and/or efficiencies thereof including improvements to computerized tax return preparation systems, electronic tax returns, preparation of electronic tax returns, user engagement with tax return preparation systems and user retention for continued use of tax return preparation systems, accounting for tax return data that has not been provided or that is not available, being able to maintain preparation continuity when, for example, a user decides not provide personal or sensitive information, which also provides for enhanced data and identity security, particularly in on-line applications, since sensitive or personal data such as SSN can be provided when needed, e.g., when required for filing, and which involve, for example, modifying or transforming "no data" situations into ones that can be used for preparation continuity and more accurate tax estimates and results by use of pseudodata or other temporary indicators. Moreover, given the modular nature of system embodiments in which tax logic based on completeness graphs is separate from user interface controller functions and interview screens, in contrast to prior "hard-wired" approaches in which tax logic is an integral part of or encoded within interview screens, the efficiency of the tax preparation software and computers executing same are improved, and such systems provide for more flexibility by being configurable in various system and networked configurations, while allowing programmers to more easily adapt to changes in the ever-evolving tax code and to more easily update tax preparation applications and modular components thereof.

BRIEF DESCRIPTION OF THE DRAWINGS

Figure 6B:
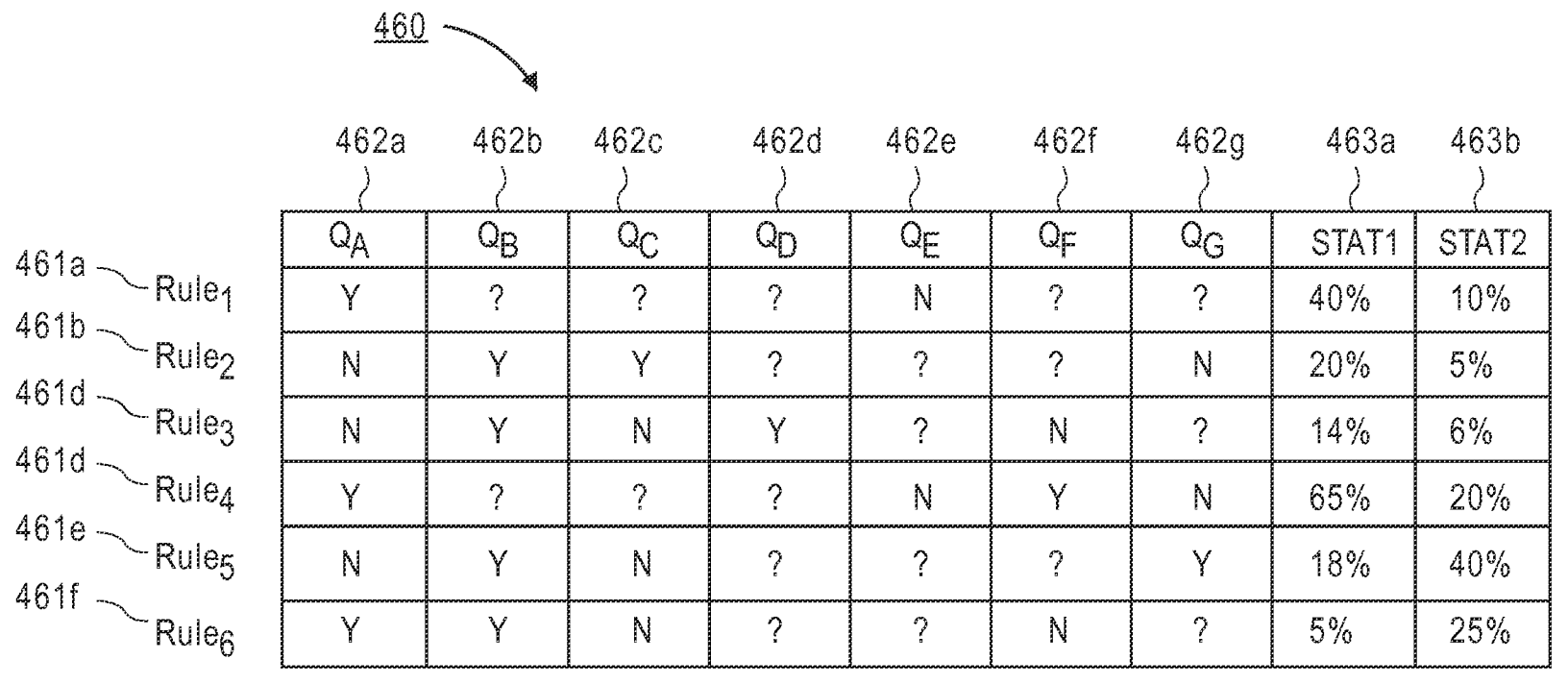

FIG. 6A illustrates a decision table based on or derived from a completeness graph of FIG. 5C, FIG. 6B illustrates another embodiment of a decision table that incorporates statistical data that may be used for determining a likelihood or probability of an answer to a question of the decision table according to embodiments, and FIG. 6C illustrates an example of how a rule engine may process a decision table when determining which question to select;

FIG. 23 depicts an example of an interview screen generated by known tax return preparation applications requiring a user to enter certain data before the user can proceed with navigating to other interview screens to continue generating the electronic tax return.

DETAILED DESCRIPTION OF ILLUSTRATED EMBODIMENTS

Embodiments involve computerized systems, computer-implemented methods, and articles of manufacture or computer program products and new tax preparation interfaces, response options and user interactions utilized for processing tax-related determinations for when a taxpayer declines or is unable to provide data requested by an interview screen generated by a tax return preparation system. For example, an interview screen may request that a user enter data that the user considers sensitive or personal data, examples of which may include the user's real and full name, address, names of family members, and social security numbers. There may be instances in which the user is not comfortable with providing personal identification information such as SSN numbers, and other instances in which the user does not recall or cannot provide the requested data since it is in tax document that the user currently does not have. With embodiments, when a user declines or is unable to enter requested tax data, for the unentered data that was the subject of the request, the user can indicate that the user has data of the type requested to enter, or that such data or topic associated with the unentered data is applicable to the user (without actually entering the data). Based on the user's response, tax return preparation systems configured or operable according to embodiments proceed with logic determinations and calculations based on a placeholder indicative of the taxpayer having a social security number, for example. At a later time, the system can request the previously requested and unentered data again, and if or when the user provides the requested data, the provided data replaces the placeholder or renders the placeholder unnecessary, and logic determinations and calculations can be repeated with the newly received data.

In this manner, embodiments allow the tax return preparation process to continue such that taxpayers to remain engaged with the preparation system. Further, embodiments provide these improvements while also conveying a sense of flexibility and sensitivity by allowing the user to forgo entry of tax data (although such data may nevertheless be required in order to complete the electronic tax return). Thus, embodiments operate in a manner that is different compared to known tax return preparation systems, and given the structural and operational rigidity and restrictions of known systems, known systems do not and are not configured to provide such flexibility and instead, known systems interpret a "blank space" or unentered data as such data not being applicable to the electronic tax return. As a result, associated determinations and calculations may be in error or do not result in an accurate estimate, which may be a further turn off to the taxpayer. Accordingly, embodiments to be more accurate without having to push the user to provide sensitive or unknown data. Further aspects of embodiments are described with reference to FIGS. 1-22.

Figure 1:
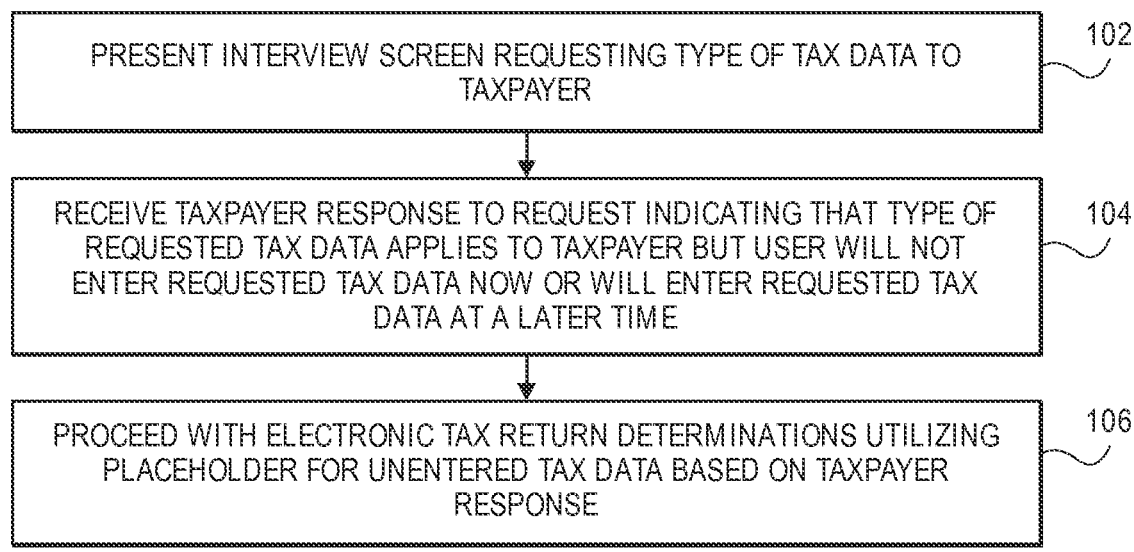
FIG. 1 is a flow diagram of one embodiment of a computer-implemented method for performing tax return determinations when a taxpayer does not provide data requested in an interview screen.
Figure 2:
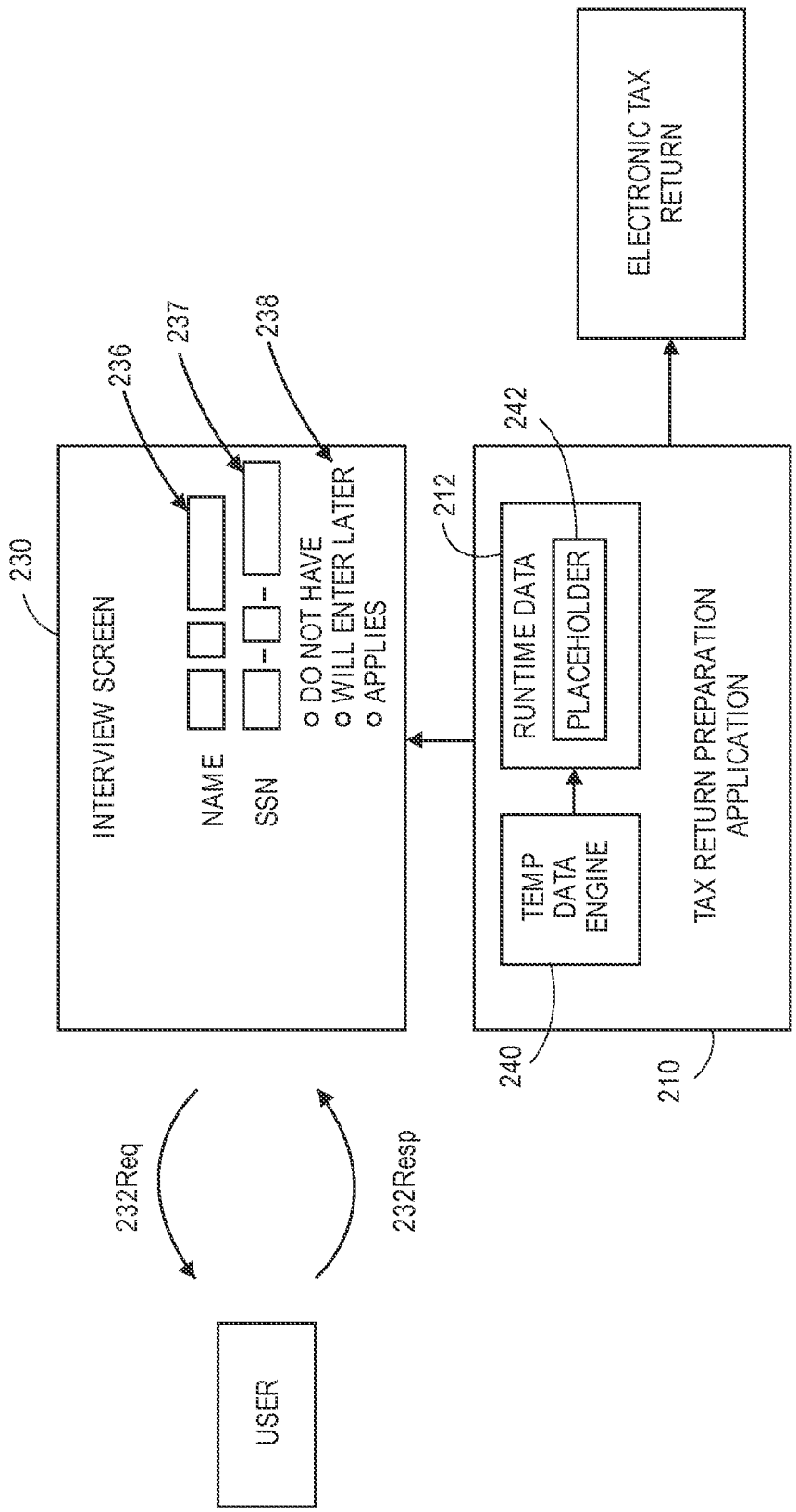
FIG. 2 is a block diagram of a computerized tax return preparation system including a temporary data engine according to one embodiment, and illustrates an interview screen that includes response options for when data is not provided by a user in response to a request for data in an interview screen.

Referring to FIG. 1, in a computer-implemented method performed according to one embodiment, at 102, a tax return preparation system presents one or more interview screens to a user requesting certain types of tax data to taxpayer. At 104, the user responds to an interview screen indicating that the requested type of tax data applies to taxpayer but that the user will not be entering the requested data, or will do so later. At 106, the modular tax return preparation system proceeds with electronic tax return determinations and calculations utilizing a placeholder that is generated or selected based on taxpayer response that the requested data is not being provided.

For example, referring to FIGS. 2A-B, which shows a system constructed according to one embodiment including a tax return preparation system 210 that is utilized to prepare an electronic tax return 220. Tax return preparation system 210 generates various interview screens 230 that request various types of information, e.g., asking the user to enter alpha and/or numeric data into designated fields, by checking a box, providing a Y/N answer to a question, or by selecting an icon or user interface element. These information requests are generally illustrated in FIG. 2A as requests 232req, and the user's responses to same are generally illustrated as 232resp. Responses with data are stored in a data store as the runtime data 212 of the electronic tax return 220.

In the illustrated example, interview screen 230 is for entry of personal information and includes fields to be filled in with information such as the user's name 236, social security number 237, address, etc., According to embodiments, interview screen 230 also includes response options 238 that can be selected by the user to provide further input regarding the status of the requested data. Examples of such response options 238 include the requested data does not apply to the user, the requested data applies to the user but is not being entered now, the requested data will be provided later, or the user does not know or have access to the requested data (e.g., in a tax document not yet received). Accordingly, it will be understood that the illustrative examples provided in FIGS. 2A-B are provided as non-limiting examples of how embodiments may be implemented. According to embodiments, tax return preparation system 210 also includes a temporary data engine 240, which is utilized to process responses 232resp that indicate that the user is not providing requested information.

Figure 3:
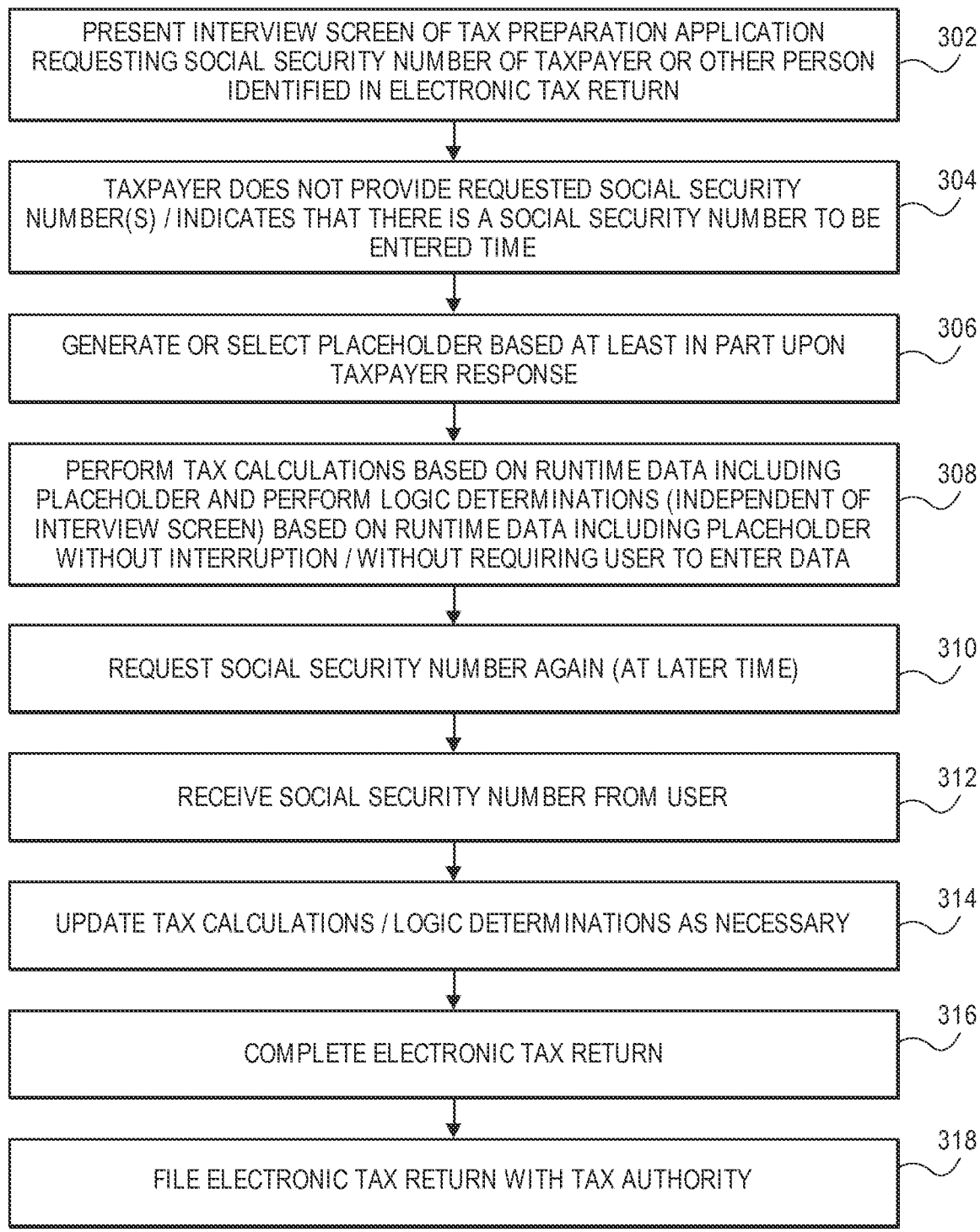
FIG. 3 is a flow diagram of one embodiment of a computer-implemented method for performing tax return determinations when a taxpayer does not provide data requested in an interview screen.

For example, with continuing reference to FIGS. 2A-B and with further reference to FIG. 3, in a computer-implemented method according to one embodiment and continuing with the example involving a request 232req for the user's personal identification data such as a social security number, at 302, tax return preparation application 210 presents interview screen 230 requesting the user's social security number (request indicated by 232req). As generally illustrated in FIGS. 2A-B, and as noted above, interview screen 230 may include various fields for entry of different types of personal information such as the user's name 236, social security number 237 and additional response options 238. At 304, user provides a response (indicated by 232resp) to the requested data through the same or different interview screen 230, and may enter the user's name, but does not provide the requested social security number. Instead, in the illustrated example, user selects a response option 238 to indicate, for example, that user has a social security number, but user is not entering the SSN now or will enter it at a later time. At 306, temporary data engine 240, in response to user's response 232resp indicating that user has but is not entering a SSN, generates or selects a temporary placeholder 242. Placeholder 242 serves as a temporary substitute for the SSN or indicates that the user has a SSN even though a SSN has not been provided.

At 308, tax return preparation system 210 proceeds to perform logic determinations and tax calculations based on runtime data including placeholder 242 based on runtime data 202 including placeholder 242, without interruption caused by the SSN not being provided and without requiring user to enter the SSN before proceeding. At 310, the unentered social security number can be requested again (e.g., to complete and/or file the electronic tax return), and at 312, user may then provide the social security number. At 314, tax logic determinations and tax calculations can be repeated as necessary to reflect the data that has now been provided. At 316, electronic tax return 220 is eventually completed and filed with a tax authority at 318. Further details regarding embodiments and aspects of embodiments are described with reference to FIGS. 4A-23. FIGS. 4A-7 illustrate embodiments of a modular tax preparation systems constructed according to embodiments in which tax logic is separate or independent of user interface functions such that these components are loosely connected or divorced from each other such that suggestions generated by a logic component regarding potential topics or questions to present to a user are "non-binding" on the user interface controller, and that includes a temporary data engine that processes user responses submitted through interview screens indicating that certain data is applicable to the user but is not being provided, or will be provided at a later time.

Figure 4A:
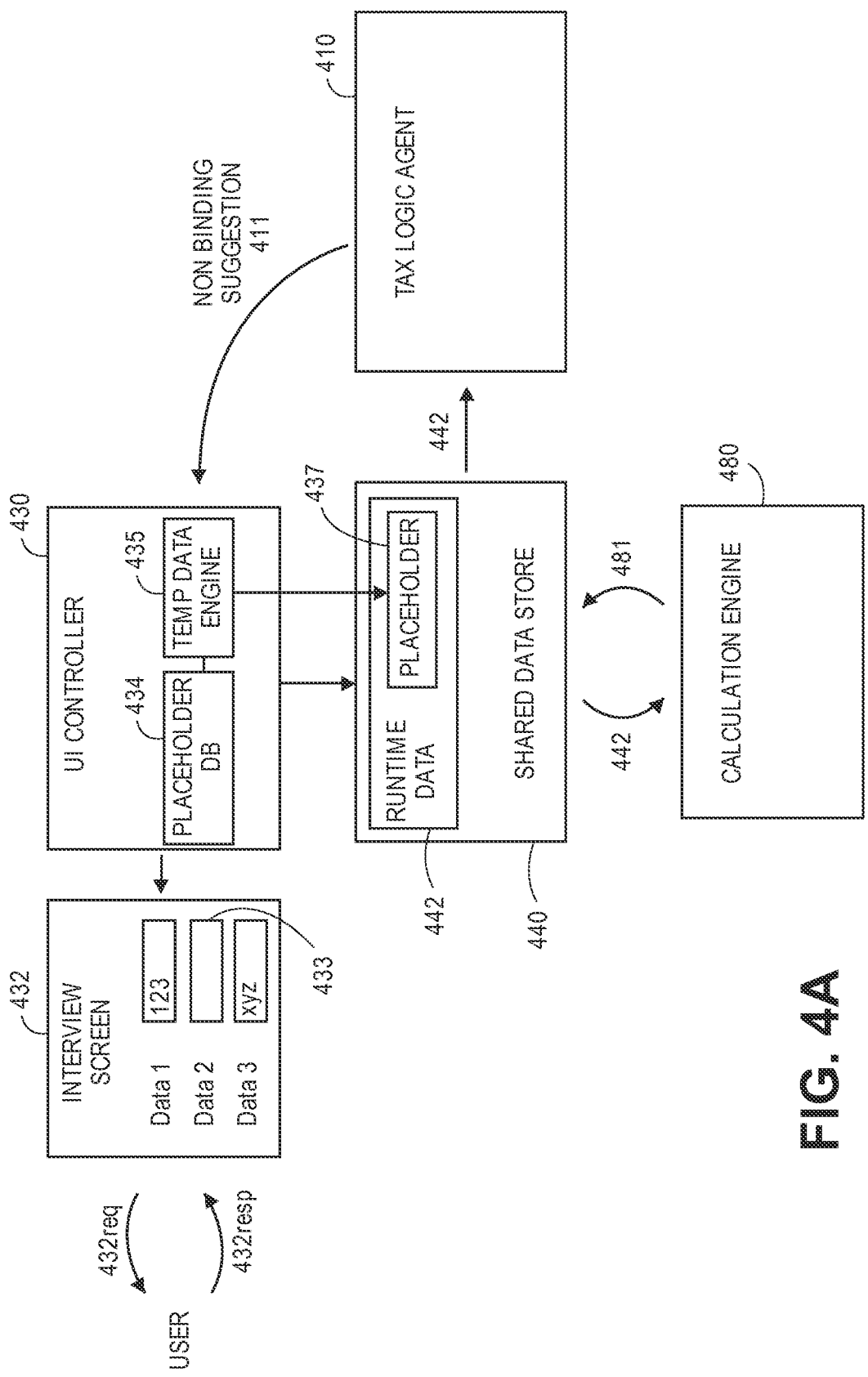
FIG. 4A is a block diagram of a computerized modular tax preparation system constructed according to one embodiment that includes a temporary data engine.

Referring to FIG. 4A, one embodiment of a modular tax preparation system 400 incorporating special purpose temporary data engine 435 that generates or selects placeholders 437 for use in logic determinations and tax calculations according to embodiments includes a data store 440 shared by a tax logic agent 410, a user interface controller 430/ temporary data engine 435, and a calculation engine 480. According to one embodiment and as illustrated, temporary data engine 435 is a component of, utilized by, or in communication with UI controller 430. Thus, while temporary data engine 435 is illustrated as a component of UI controller 430 in FIG. 4A, it will be understood that other system configurations may be utilized.

With the system configuration shown in FIG. 4A, UI controller 430 generates interview screens 432 that request 432req various types of data including personal information (name, SSN, date of birth, address, marital status, names and SSNs of dependents etc.), employer information, etc. User may respond to some requests, but not others (as generally illustrated by blank fields 433). For example, user may not respond if the user is not comfortable providing certain data given the personal or sensitive nature of the data, or does not have or know the requested data. In this case, temporary data engine 435, in response to user's response 432resp of not providing certain data but indicating that the data applies to the user, generates or selects a placeholder 437, which is written to shared data store 440.

Calculation engine 480 reads placeholder 442, which may be in the form of pseudodata or in the form of a flag or bit indicating that a certain tax type of data, topic or tax situation applies despite corresponding data not being provided in field 433. For example, pseudodata for a social security number may be a generic number that can be used for various taxpayers (e.g., 555-55-5555), and a flag or bit may indicate "Y" the data type, topic or situation applies, or "N" the data type, topic or situation does not apply. Calculation engine 480 performs calculations based on the pseudodata itself and/or based on the data type, topic or tax situation applying as indicated. Calculation engine 480 writes calculation results 481 back to the shared data store 440, with appropriate flags or tags as needed to indicate that certain data is based on the user's response 432resp. Tax logic agent 410 reads runtime data 442, including data as updated by the UI controller 430, temporary data engine 435 and/or calculation engine 480, and performs logic determinations utilizing the runtime data 442 including placeholder 437 and generates a non-binding suggestion 411 for consideration by UI controller 430.

Eventually, UI controller 430 presents the same interview screen 432 again, or another interview screen 432 including a list of data that the user indicated applied but did not yet enter, and when the requested data is eventually entered and the electronic tax return is completed, the electronic tax return can be filed with a tax authority.

Figure 4B:
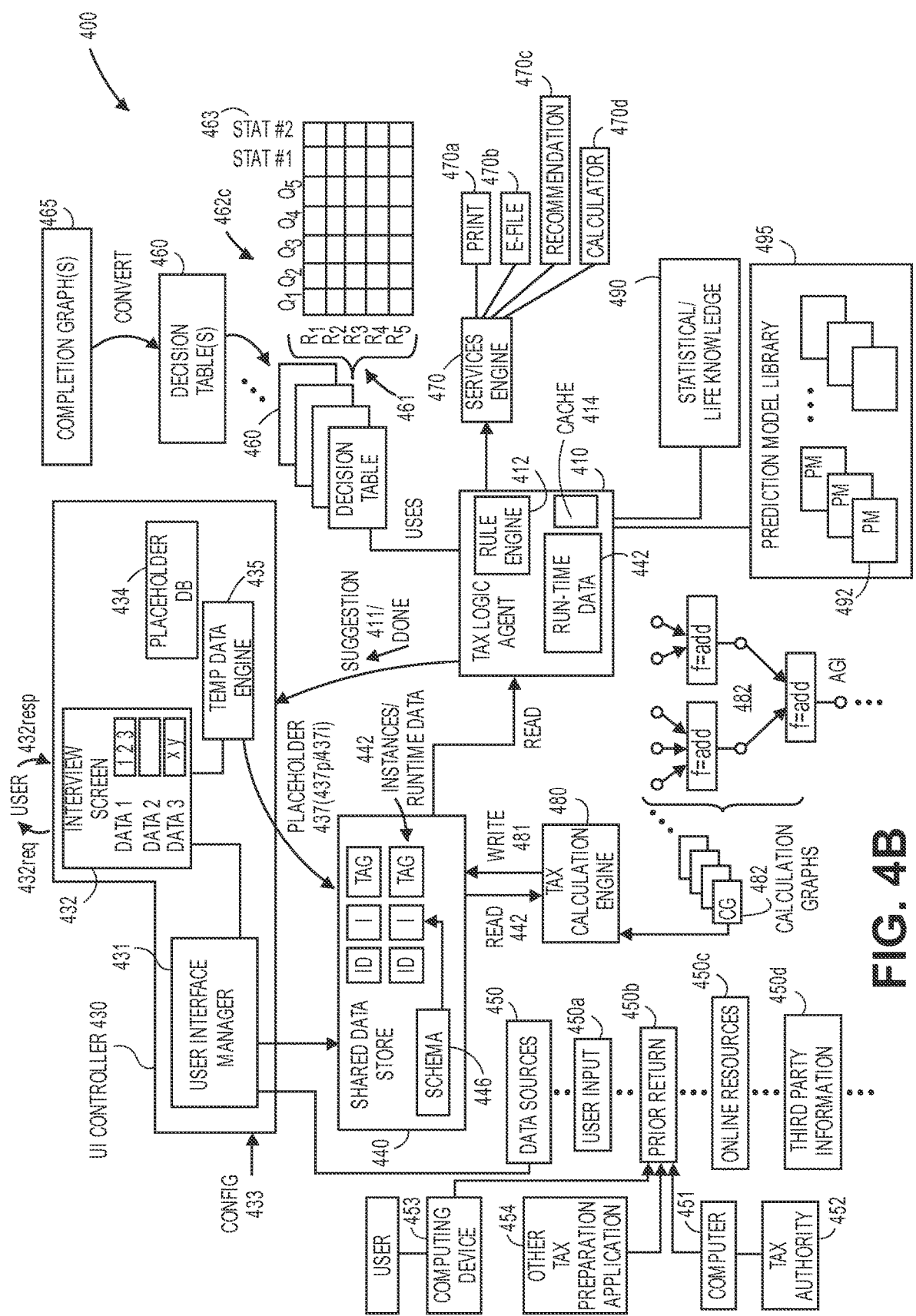
FIG. 4B illustrates a block diagram of a computerized modular tax preparation system constructed according to one embodiment and illustrating system components and associated graph data structures and decision tables and how temporary data engine may be a component of or utilized by a user interface controller.

FIG. 4B illustrates a more specific embodiment of a modular tax return preparation system 400 constructed according to embodiments that includes a special purpose temporary data engine 435, and given the modular nature and flexibility provided by the system 400, allows a user to forgo entering certain data and instead indicate that type of data, topic or situation is applicable to the user. Such indications may involve, for example, "I have a SSN but am not entering it now"), which allows the system to proceed on the basis that a SSN or other data exists, even though it has not been entered. As shown in FIG. 4B, system 400 includes tax logic agent (TLA) 410 comprising or executing a declarative rule engine or processor 412 that is used to scan or analyze decision tables 460 derived from completion graphs 465 using runtime or instance data 442 read by tax logic agent 410 and stored to a fact cache 414. Tax logic agent 410 generates non-binding suggestions 411 including candidate questions 462. More specifically, rule engine 412 generates either non-binding suggestions 411 of additional topic(s) or question(s) 462 to present to a user, or "Done" instructions which indicate that completeness has occurred for a particular topic or for an electronic tax return as a whole such that no additional input for the topic or electronic tax return is not needed. Depending on system 400 configurations, rule engine 412 may operate in the form a Drools expert engine. Other computerized declarative rules engines 412 may be utilized and a Drools expert rule engine is provided as one example of how embodiments may be implemented. Thus, system components including tax logic agent 410 do not involve logic determinations performed by a human or user of the system 400. Tax logic agent 410 may be implemented as a dedicated module or engine that is executed by or as part of a tax return preparation application and may be embodied as a programmed subroutine that is executed by a processor or controller as described herein.

Further, given the modular nature of system 400 components, components may be incorporated into a tax return preparation application or be executed as a distributed system on two or more different computing systems through respective networks. Tax logic agent 410 determinations can be determined separately of UI controller 430 functions, which are performed separately of calculation engine 480 processing, one or more or all of which may be managed by respective independent computers through respective networks such that communications between components described herein may be performed through respective networks between respective computing devices. Thus, embodiments provide for a flexible, modular tax return preparation system, capable of different system configurations, in which UI determinations and interview screen presentment are independent of tax logic and tax calculations.

In certain embodiments, and as illustrated in FIG. 4, tax logic agent 410 reads runtime data 442 from shared data store 440, which is shared by UI controller 430 and tax calculation engine 480. Tax logic agent 410 can read runtime data 442 from shared data store 440, UI controller 430 can write data to shared data store 440, and calculation engine 480 can read data from shared data store 440, perform a calculation of calculation graph 482, and write a calculation result 481 to shared data store 440.

Tax logic agent 410 is operable to receive runtime or instance (I) data (generally, runtime tax return data 442) based on a "dictionary" of terms of data model or schema 446 (generally, schema 446). Schema 446 specifies, defines or lists tax-related concepts or terms, e.g., by names, type or category and hierarchy such as "name," "social security number," "citizenship," "address," "employer," "interest," "dividends," "mortgage," "deduction," "tax credit," "capital gain," etc.

An instance 442 is instantiated or created for the collection of data received and for each term or topic of schema 446. Schema 446 may also specify data constraints such as a certain format of questions and answers (e.g., answer is binary (Y/N) or a number/value or how data of certain schema elements should be configured or structured). It will be understood that schema 446 may define hundreds or thousands of such concepts or terms and may be defined in various ways, one example is based on an Extensible Markup Language (XML) schema. Non-limiting examples of schemas 446 that may be utilized in embodiments include Modernized E-File (MeF) and MeF++ schemas. Further, it will be understood that embodiments may utilize various other schemas, and that these schemas are provided as a non-limiting example of schema 446 that can be utilized in embodiments.

Instances (I) or objects of a schema 446 element can be identified and distinguished (e.g., for multiple instances or objects of the same topic or tax form), and a generated identifier (ID) for an instance (I) based on schema 446 when writing data to shared data store 440. Thus, instances (I) of runtime data 442 and non-binding suggestions 411 that may involve the same term or element of schema 446 are distinguished by the generated identifier (ID). For example, if a taxpayer has multiple Form W-2s for different jobs, or multiple 1099-INT forms for interest earnings from different financial institutions, these instances or objects of the same schema 446 element can be uniquely identified and distinguished. In this manner, calculation engine 480, tax logic agent 410, and UI controller 430, initially and when processing non-binding suggestions 411, can uniquely identify the proper Form W-2 or Form 1099-INT that is the subject of a calculation result 481 or non-binding suggestion 411.

With continuing reference to FIG. 4B, runtime data 442 of shared data store 440 is used to eventually populate corresponding fields of an electronic tax return or electronic tax forms or documents and may be received from or based on data from various data sources 450a-d (generally, source 450). Examples of sources 450 or type of source data include user input or manual entry 450a of data into an interview screen 432 generated by UI controller 430, data imported from one or more prior year electronic tax returns 450b, which may be received from a computer 451 of a tax authority 452 with which the prior year electronic tax return was filed, a prior year tax return file locally stored on a user's computing device 453, or a tax return file from another tax preparation application 454.

For example, a tax return preparation system 400 constructed according to embodiments may be provided by Intuit Inc., and retrieves an electronic file that was prepared using a different tax preparation application available from H&R Block. Other examples of sources 450 or source data include data from online resources 450c (such as online social networks such as facebook.com, linkedin.com or other online resources) and third party databases 450d or resources (such as government databases or documents, such as property tax records, Department of Motor Vehicle (DMV) records, etc. Other examples of sources 450 include a financial management system such as Mint™, FINANCE-WORKS, QUICKEN, and QUICKBOOKS financial management systems available from Intuit Inc., Mountain View, Calif.

A FMS account may include transaction data indicating categories or types of items or services purchased by a taxpayer and in some cases, item-level data, such as Level III data, identifying specific items or services that were purchased. A FMS is defined to include, any computing system implemented, on-line or web-based, system, package, program, module, or application that gathers financial data, has the capability to receive or retrieve financial data including item-level electronic transaction data, analyze and categorize at least part of the financial data into various reports or displays that are provided to a consumer, and provides consumer with the capability to conduct, and/or monitor, financial transactions. Types of financial management systems include, but are not limited to any of the following: an on-line, or web-based, or computing system implemented receipt collection financial management system, package, program, module, or application (generally, "system"), personal financial management system, personal accounting system, personal asset management system, personal/home business inventory system, business accounting system, business financial management system, business inventory system, business asset management system, healthcare expense tracking system, and data management system as discussed herein, and/or as known in the art at the time of filing, and/or as developed after the time of filing.

Source 450 may also be an account the user has with a financial institution (FI), such as a checking account or credit card account. Such FI accounts may also include transaction data for purchases made by taxpayer and may indicate a category of purchase or specific items that were purchased. Thus, UI controller 430 may receive data from and communicate with various sources or external resources 450.

With continuing reference to FIG. 4B, tax logic agent 410 reads runtime data 442 from shared data store 440 and utilizes or executes rules 461 expressed in a data structure such as decision table 460. Decision table 460 is based on graphical structure or completeness graph 465 to determine, based on currently available runtime electronic tax return data 442, what other data or answers are still needed in view of unanswered questions 462. In other words, tax logic agent 410 determines which conditions of a rule 461 still need to be satisfied in order to reach a conclusion or completeness status for subject matter or topic of decision table 460, and in turn, which questions 462 of decision table 460 or other data structure should be presented to user in order to obtain that other needed data to reach a conclusion or state of completeness for that topic. For example, a rule 461 specified by decision table 460 may be based on a tax authority requirement or law, and may generally specify that If X, and Y, and Z, then Conclusion.

Rules 461 may involve various topics and may specify types of data or tax documents that are required, or which fields or forms of the electronic tax return should be completed. One simplified example is if a taxpayer is married, then the electronic tax return is required to include information about a spouse. Tax rule 461 may involve if a certain box on a form (e.g., Box 1 of Form W2) is greater than a pre-determined amount, then certain fields of the electronic tax return (e.g., withholding fields) cannot be left empty and must be completed. Or, if Box 1 of Form X is populated, then Form Y must be completed. Thus, tax rules 461 may reflect various tax requirements and are expressed using the concepts or terms of the data model or schema 446.

Rules 461 are utilized or scanned by tax logic agent 410 to identify or narrow which questions 462, as provided in decision table 460, are identified as potential or candidate questions 462 to be presented to user. This may involve utilizing rules 461 based on one or more associated data structures such as decision table 460, which is based on a completion graph 465. Completion graph 465 recites, for example, requirements of tax authority or tax authority rules or laws. Decision table 460 may be used for invalidation of potential questions 462 or topics and input or runtime data 442 requirements.

FIGS. 5A-C and 6A-C illustrate graphically how tax legislation/tax rules 500 are broken down into completeness graph 465 and tax calculation graph 482. Tax legislation or rules 500 are parsed or broken into various topics. For example, there may be nearly one hundred topics that need to be covered for completing a federal tax return. There may be various numbers and many tax topics that need to be covered. When tax legislation or tax rules 500 are broken into various topics or sub-topics, each particular topic (e.g., topics A, B) may each have their own dedicated completeness graph 465, and tax calculation graph 482.

Figure 5A:
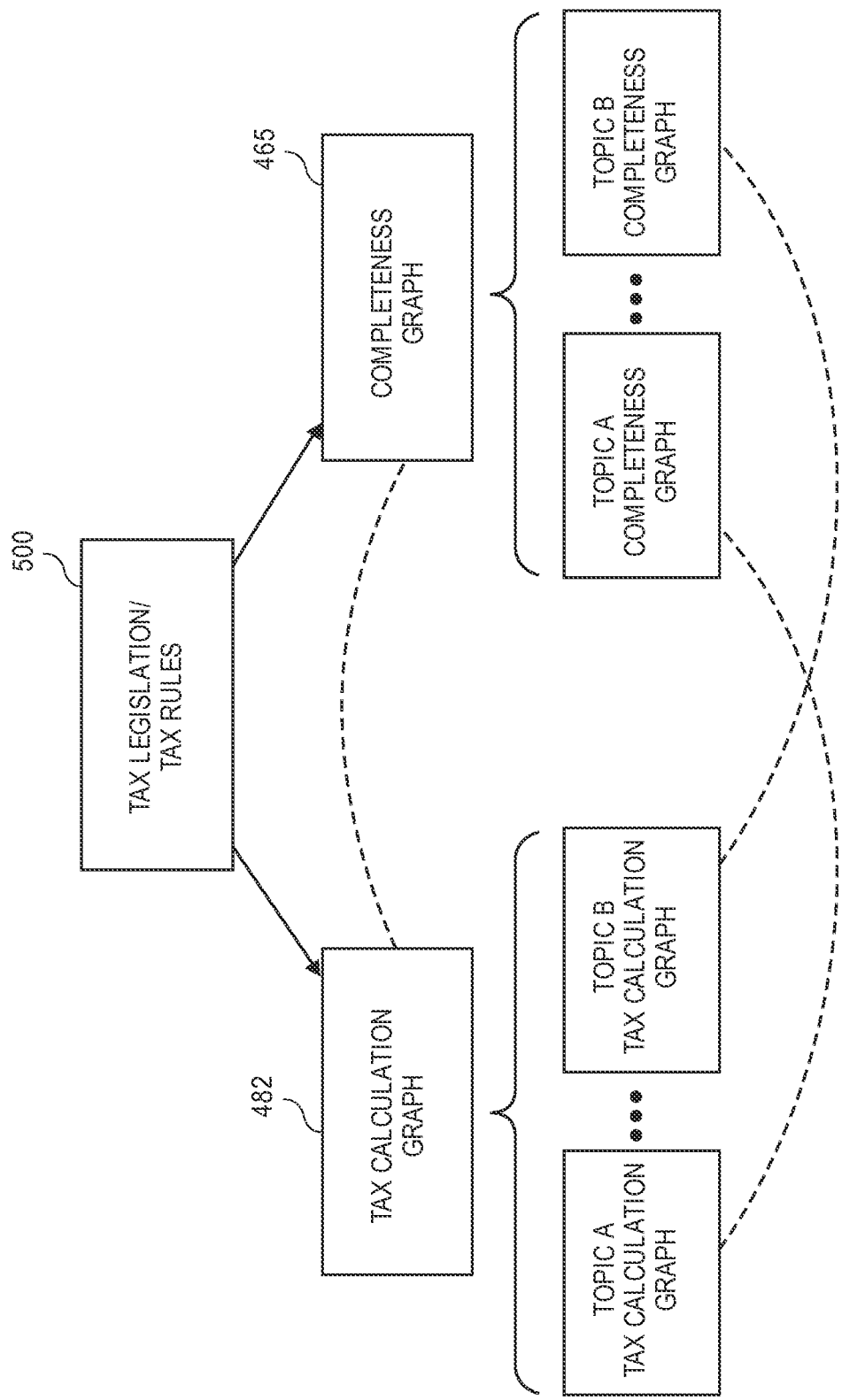
FIG. 5A schematically illustrates how tax legislation/tax rules are parsed and represented by a completeness graph and a tax calculation graph according to embodiments.

As shown in FIG. 5A, completeness graph 465 and tax calculation graph 482 are interdependent as illustrated by dashed lines. In other words, some elements contained within completeness graph 465 are needed to perform actual tax calculations using tax calculation graph 482. Likewise, aspects within tax calculation graph 482 may be needed as part of completion graph 465. Thus, for example, depending on how a system and linking between a completeness graph 465 and tax calculation graph 482 are configured, completion graph 465 may reference or be associated with a particular schema 446 element and associated instance data 442 in shared data store 440, and completion graph 465 may include a pointer or reference to that section of calculation graph 465, and/or calculation graph 465 may include a pointer or reference to a section of completion graph 465. Taken collectively, completeness graph 465 and tax calculation graph 482 represent data structures that capture all the conditions necessary to complete the computations that are required to complete a tax return that can be filed. Completeness graph 465, for example, determines when all conditions have been satisfied such that a "fileable" tax return can be prepared with current runtime data 442. Completeness graph 465 is used to determine, for example, that no additional data input is needed for a particular topic or for a tax return as a whole such that the electronic tax return can be prepared and ultimately filed. Individual combinations of completeness graphs 465 and tax calculation graphs 482 that relate to one or more topics can be used complete the computations required for some sub-calculation. In the context of a tax setting, for example, a sub-selection of topical completeness graphs 465 and tax calculation graphs 482 can be used for intermediate tax results such as Adjusted Gross Income (AGI) or Taxable Income (TI).

Figure 5B:
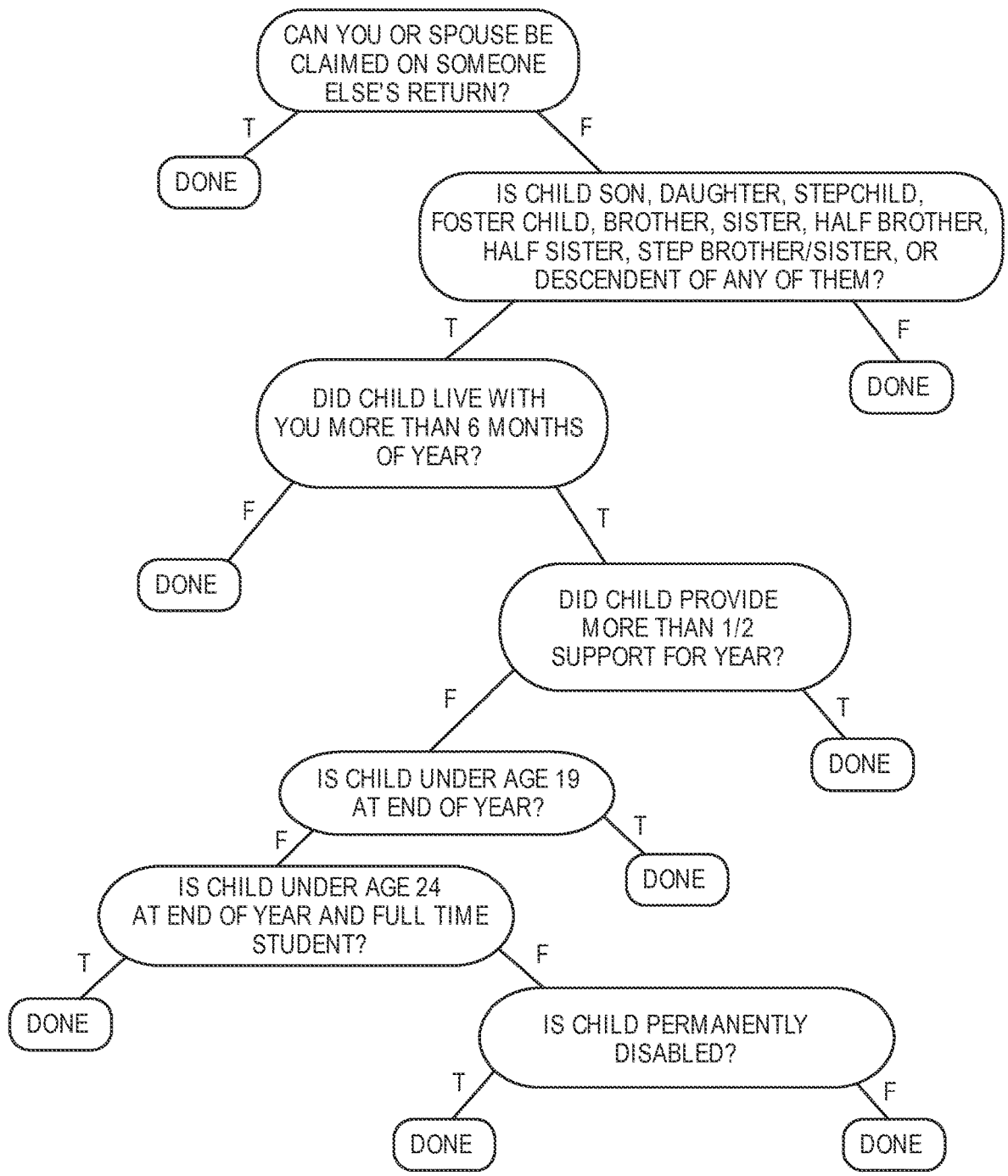
FIG. 5B illustrates an example of a simplified version of a completeness graph related to a qualifying child for purposes of determining deductions for federal income tax purposes.
Figure 5C:
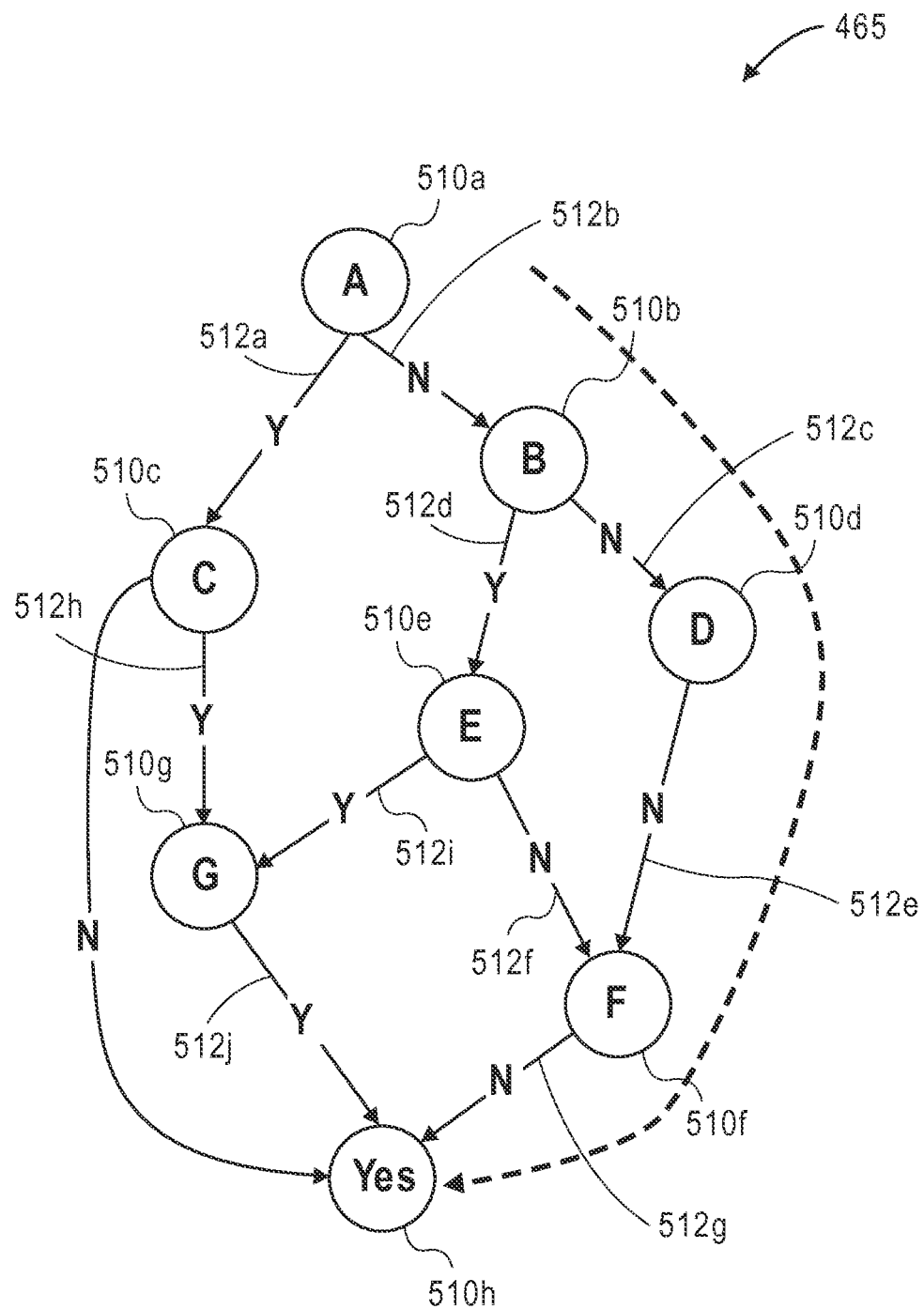
FIG. 5C illustrates an example of a directed graph or completeness graph.

Completeness graph 465 and tax calculation graph 482 represent graphical data structures that can be constructed in the form of tree, and decision table 460 reflects the structure and relationships expressed in completeness graph 465. FIG. 5C generally illustrates completeness graph 465 in the form of a tree structure including nodes 510a-g, in which node 510a is a beginning or start node, a "Yes" or termination node 510h indicating completion, and arcs 512 a-j representing different possible answers and the relationship between different nodes 510 or questions depend on a basic or general version of a completeness graph 465 for the particular topic, such as determining whether a child qualifies as a dependent for federal income tax purposes. FIG. 5B illustrates an example of a flow-chart based representation of questions, and a more complete flow chart-based representation of questions related to determining a "qualified child" may be found in U.S. patent application Ser. No. 14/097,057, entitled "Methods Systems and Computer Program Products for Applying Generates Rules for Personalized Interview Experience,", the contents of which are incorporated herein by reference as though set forth in full.

Each node 510 in the completion graph 465 of FIG. 5C contains a condition that in this example is expressed as a Boolean expression that, in the illustrated embodiment, can be answered in the affirmative or negative. Arcs 512 that connect each node 510 illustrate the answers and dependencies between nodes 510, and the combination of arcs 512 in completeness graph 465 illustrates the various pathways to completion. A single arc 512 or combination of arcs 512 that result in a determination of "Done" represent a pathway to completion. As generally shown in FIG. 5C, there are several pathways to completion.

More specifically, FIG. 5C generally illustrates completeness graph 465 that includes beginning node (Node A) 510a, intermediate nodes (Nodes B-G) 510b-g and a termination node (Node "Yes" or "Done") 510h. Each of the beginning node 510a, and intermediate nodes 510b-g represents a question. Inter-node connections or arcs 512 represent response options. In the illustrated embodiment, each inter-node connection 512 represents an answer or response option in binary form (Y/N), for instance, a response to a Boolean expression. It will be understood, however, that embodiments are not so limited, and that a binary response form is provided as a non-limiting example. In the illustrated example, certain nodes, such as nodes A, B and E, have two response options, whereas other nodes, such as nodes D, G and F, have one response option.

As a specific example, referring again to FIG. 5B, one pathway to completion is where an affirmative (True) answer is given to the question of whether you or a spouse can be claimed on someone else's tax return. If such a condition is true, your child is not a qualifying dependent because under IRS rules you cannot claim any dependents if someone else can claim you as a dependent. In another example, if you had a child and that child did not live with you for more than 6 months of the year, then your child is not a qualifying dependent. Again, this is a separate IRS requirement for a qualified dependent.

As will be understood, given the complexities and nuances of the tax code, many tax topics may contain completeness graphs 465 that have many nodes 510 with a large number of pathways to completion. However, by many branches or lines within the completeness graph 465 can be ignored, for example, when certain questions internal to the completeness graph 465 are answered that eliminate other pathways, or other nodes 510 and arcs 512, within the completeness graph 465. The dependent logic expressed by the completeness graph 465 utilized according to embodiments allows one to minimize subsequent questions based on answers given to prior questions, which allows for generation of a reduced or minimized question set that is presented to a user as explained herein, thus providing for more efficient, meaningful and user friendly tax return preparation experience.

Referring to FIG. 6A, decision table 460 generated by transformation of completeness graph 465 illustrated in FIG. 5C reflects the question-and-answer flow of completeness or directed graph 465. In the illustrated example, rows of decision table 460 define rules 461a-e (e.g., Rules R1-R5 as shown in FIG. 6A), and columns of the decision table 460 indicate questions 462a-g (generally, questions) (Q1-Q5 shown in FIG. 4 OR Qa-Qg as shown in FIG. 6A). During processing, decision table 460 is scanned by tax logic agent 410 to determine which answers 464 or which aspects of a rule 461 or condition elements are included in received runtime data 442 stored in tax logic agent cache 414 and read from shared data store 440. Tax logic agent 410 determines how much the runtime data 442 completes decision table 460 and determines or selects candidate questions 462 to be presented to user, answers to which would complete respective rule 461 conditions reflected in decision table 460.

Thus, tax logic agent 410 uses decision tables 460 to analyze the runtime data 442 and determine whether a tax return is complete, and each decision table 460 created for each topic or sub-topic is scanned or otherwise analyzed to determine completeness for each particular topic or sub-topic. In the event that completeness has been determined with respect to each decision table 460, then rule engine 412 outputs a "done" instruction to UI controller 430. If rule engine 412 does not output a "done" instruction that means there are one or more topics or sub-topics that are not complete, which, as explained in more detail below presents interview questions to a user for answer. Tax logic agent 410 identifies decision table 460 corresponding to one of the non-complete topics or sub-topics and, using the rule engine 412, identifies one or more non-binding suggestions 411 to present to UI controller 430. Non-binding suggestions 411 may include a listing of compilation of one or more questions from one or more decision tables 460.

The following pseudo code generally expresses how a rule engine 412 functions utilizing tax logic agent fact cache 414 based on the runtime canonical data 442 or the instantiated representation of the canonical tax schema 446 at runtime and generating non-binding suggestions 411 provided as an input to UI controller 430. As described in U.S. application Ser. No. 14/097,057 incorporated herein by reference, data such as required inputs can be stored to fact cache 414 so that the needed inputs can be recalled at a later time, and to determine what is already known about variables, factors or requirements of various rules:

Rule engine (412)/Tax logic agent (TLA) (410)
// initialization process
Load_Tax_Knowledge_Base;
Create_Fact_Cache; While (new_data_from_application)
Insert_data_into_fact_cache;
   collection=Execute_Tax_Rules; // collection is all the
     fired rules and corresponding conditions
suggestions=Generate_suggestions (collection);
send_to_application(suggestions);

In one embodiment, as shown in FIG. 6B, statistical data 463a-b (which may be appended as columns to rule-question decision table 460 shown in FIG. 6A, may be received from or based on data collected by life knowledge module 490 described in further detail below) indicates how likely a question or topic 462 is to be relevant to a user given a set of runtime data 442 and may be utilized by rule engine 412 when determining which candidate question or topic 462 to select.

Instead of, or in addition to, statistical data 463, embodiments may also involve tax logic agent 410 executing one or more predictive models 492, which may be part of a predictive model library 495, for purposes of determining how likely a question or topic 462 is to be relative to a given user based on input runtime data 442. Examples of predictive models 492 that may be utilized for this purpose include predictive modeling techniques selected from the group consisting of: logistic regression; naive bayes; k-means classification; K-means clustering; other clustering techniques; k-nearest neighbor; neural networks; decision trees; random forests; boosted trees; k-nn classification; kd trees; generalized linear models; support vector machines; and substantial equivalents thereof.

For example, in embodiments that utilize statistical data, decision table 460 may include columns that contain statistical data 463 in the form of percentages. Column (STAT1 shown in FIG. 6B) may contain a percentage value that indicates taxpayers under the age of thirty-five where $Rule_1$ is satisfied. Another column (STAT2 shown in FIG. 6B) may contain a percentage value that indicates taxpayers over the age of thirty-five where $Rule_1$ is satisfied. Any number of additional columns could be added to the decision table 460 and statistics do not have to relate to an age threshold or grouping. Statistical data 463 may be used by the tax return preparation application to determine which of the candidate questions ($Q_A$-$Q_G$) 462 should be selected by tax logic agent 410 for presentation to or asked of user. Statistical data 463 may be compared to one or more known taxpayer data fields (e.g., age, income level, tax filing status, geographic location, or the like) such that the question that is presented to the user is most likely to lead to a path to completion. Candidate questions 462 may also be excluded or grouped together and then presented to the user to efficiently minimize tax interview questions during the data acquisition process. For example, questions 462 that are likely to be answered in the negative can be grouped together and presented to the user in a grouping and asked in the negative—for example, "we think these question do not apply to you, please confirm that this is correct." This enables the elimination of many pathways to completion that can optimize additional data requests of the taxpayer.

For example, life knowledge module 490 may indicate that taxpayers residing within a particular zip code are more likely to be homeowners than renters. Tax logic agent 410 may use this knowledge to weight particular questions related to these topics when processing rules 461 and questions 462 and generating non-binding suggestions 411. Tax logic agent 410 may also receive or otherwise incorporate information from life knowledge module 490 for these purposes. Life knowledge module 490 contains statistical or probabilistic data and/or results generated by predictive models related to the current or other users of the tax return preparation application and/or other taxpayers.

While FIG. 4B illustrates statistical data 463 of decision table 460 and predictive models 492 being utilized by tax logic agent 410, in other embodiments, as described below, statistical data 463 and predictive models 492 may be utilized by temporary data engine 435.

Non-binding suggestions 411 generated by tax logic agent 410 may be, for example, a question, declarative statement, identification of a topic and may include a ranked listing of suggestions 411. Ranking may be weighted in order of importance, relevancy, confidence level, or the like. According to one embodiment, statistical data or results generated by predictive models may be incorporated by tax logic agent 410 to be used as part of the candidate question ranking which, in turn, may be used by tax logic agent 410 to assign a ranking to the non-binding suggestions 411 generated by tax logic agent 410.

For example, questions 462 about home mortgage interest may be promoted or otherwise given a higher weight for users in particular zip codes or income levels. Statistical knowledge 490 or results generated by execution of predictive models may apply in other ways as well. For example, tax forms often require a user to list his or her profession. These professions may be associated with transactions that may affect tax liability. For instance, a taxpayer may list his or her occupation as "teacher." Life knowledge module 490 may contain data that shows that a large percentage of teachers have retirement accounts, and in particular, 403(b) retirement accounts. This information may then be used by tax logic agent 410 when generating its non-binding suggestions 411. For example, rather than asking generically about retirement accounts, the non-binding suggestion 411 can be tailored directly to a question about 403(b) retirement accounts. According to one embodiment, candidate question scoring and ranking is used to select candidate questions 462 to use to generate a non-binding suggestion 411, and according to another embodiment, ranking is also used to impose a ranking of non-binding suggestions 411 themselves for reference by UI controller 430.

Candidate questions 462 of a non-binding suggestion 411, and non-binding suggestions 411 themselves, may be ranked as described in U.S. application Ser. No. 14/462,058, filed Aug. 18, 2014, entitled "Computer Implemented Methods Systems and Computer Program Products for Ranking Non-Binding Suggestions During Preparation of Electronic Tax Return and U.S. application Ser. No. 14/461,982, filed Aug. 18, 2014, entitled "Computer Implemented Methods Systems and Computer Products for Candidate Question Scoring and Ranking During Preparation of Electronic Tax Return, the contents of all of which are incorporated herein by reference as though set forth herein in full. Such ranking may be based on, for example, a type of probability, estimate, assumption or inference determination, which may involve statistical analysis or execution of a predictive model using electronic tax return data as inputs.

Data that is contained within life knowledge module 490 may be obtained by analyzing aggregate tax data of a large body of taxpayers. For example, entities having access to tax filings may be able to mine their own proprietary data to establish connections and links between various taxpayer characteristics and tax topics. This information may be contained in a database or other repository that is accessed by life knowledge module 490. This information may be periodically refreshed or updated to reflect the most up-to-date relationships. Generally, the data contained in the life knowledge module 490 is not specific to a particular taxpayer but is rather generalized to characteristics shared across a number of tax payers although in other embodiments, the data may be more specific to an individual taxpayer.

In one embodiment, rule engine 412 reads runtime data 442 and uses that data 442 as answers or inputs to tax logic in the form of decision table 460 derived from or based on completion graph 465 to eliminate rules 461 that may apply which, is used to eliminate questions 462 from consideration rather than requiring the user to step through each question of a pre-determined sequence of questions in order to conclude that a particular tax situation or topic applies to the user.

Referring to FIG. 6C, and continuing with the example of decision table 465 shown in FIG. 6A, runtime data 442 that is known is used to determine which rows or rules 461 to cross out in decision table 460. In the illustrated example, if it is known from runtime data 442 that the answer to Question A is "Y" then rules 461 R3-R5 involving a "N" answer to Question A are not applicable, and those rows or rules 461 of decision table 460 including a "N" answer to Question A (i.e., the bottom three rows in the illustrated example) can be crossed out 1010 or eliminated from consideration. This leaves two rows or rules 461 R1 and R2 in the illustrated example. Since questions B, D and E are "don't care" or "not relevant" (indicated by "?") and the answer to Question A is already known ("Y"), then the remaining candidate questions 462 that require answers based on the current runtime data 442 include Questions C and G. Thus, rule engine 412 uses decision table 460 to select one or more rules 461 and determine or select one or more candidate questions 462 that are unanswered in view of current runtime or instance data 442 and that should be presented or asked of the user to proceed to completion.

Tax logic agent 410 provides to UI controller 430 a non-binding suggestion 411 comprising a selected question or topic 461 to be addressed. In the illustrated embodiment, UI controller 430 includes a UI or user experience manager 430 that determines how to process the non-binding suggestions 411 with selected questions 461 and generates an interface or interview screen 432 for the UI or selects an interview screen of the UI based on the question or topic 461 of the non-binding suggestion 411. For ease of explanation, reference is made to interview screen generator 432 or resulting interview screen 432. UI controller 430 may include suggestion resolution element, a generator element, and an interview screen management element or flow/view management" module, as described in U.S. application Ser. No. 14/097,057, filed Dec. 4, 2013, entitled Methods Systems and Computer Program Products for Applying Generated Rules for Personalized Interview Experience", the contents of which are incorporated herein by reference as though set forth in full.

For example, as described in the above-identified incorporated application, a configuration file 433 of UI controller 430 may specify whether, when and/or how non-binding suggestions 411 are processed. For example, a configuration file 433 may specify a particular priority or sequence of processing non-binding suggestions 411 such as now or immediate, in the current interview screen 432, in the next interview screen 432, in a subsequent interview screen 432, in a random sequence (e.g., as determined by a random number or sequence generator), or that UI controller 430 should wait for additional data and/or until a final review stage initiated by the user. As another example, this may involve classifying non-binding suggestions 411 as being ignored. A configuration file 433 may also specify content (e.g., text) of the interview screen 432 that is to be generated based at least in part upon a non-binding suggestion 411. The ability to add, delete and change configuration files 433 for various UI purposes without have to modify other system components further demonstrates the benefits of the modular tax return preparation system 400.

In the illustrated embodiment, UI manager 431 of UI controller 430 may include a generator element that is in communication with a suggestion element and that generates the resulting user interaction or experience or creates or prepares an interview screen 432 or content thereof based on the output of the suggestion element and input received from the interview screen management element. For this purpose, generator element may communicate with the interview screen management element, which manages a library of visual assets. Visual assets may be pre-programmed interview screens that can be selected by the interview screen management element and provided to the generator element for providing resulting interview screen 432 or content or sequence of interview screens 432 for presentation to the user. Visual assets may also include interview screen 432 templates, which are blank or partially completed interview screens 432 that can be utilized by the generation element to construct an interview screen on the fly during runtime in the event that an appropriate pre-programmed or pre-determined interview screen or other visual asset is not available or cannot be identified by the interview screen management element.

More specifically, in one embodiment, as described in the incorporated application, UI manager 431 of the UI controller 430 includes a suggestion resolution element or "Suggestion Resolver," a generator element or "Generator," and an interview screen management element or "Flow/View Management." The suggestion resolution element is responsible for resolving the strategy of how to respond to incoming non-binding suggestions 411. For this purpose, the suggestion resolution element may be programmed or configured internally, or based on interaction configuration files 433, which specify whether, when and/or how non-binding suggestions 411 are processed. For example, a configuration file 433 may specify a particular priority or sequence of processing non-binding suggestions 411 such as now or immediate, in the current interview screen, in the next interview screen, in a subsequent interview screen, in a random sequence (e.g., as determined by a random number or sequence generator), or that the UI manager 430 should wait for additional data and/or until a final review stage initiated by the user. As another example, this may involve classifying non-binding suggestions as being ignored. A configuration file 433 may also specify content (e.g., text) of the interview screen 432 that is to be generated based at least in part upon a non-binding suggestion 411.

The generator element is in communication the suggestion element and generates the resulting user interaction or experience or creates or prepares an interview screen 432 or user interface or content thereof based on the output of the suggestion element and input received from the interview screen management element. For this purpose, the generator element may communicate with the interview screen management element, which manages a library of visual assets. Visual assets may be pre-programmed interview screens that can be selected by the interview screen management element and provided to the generator element for providing the resulting interview screen or content or sequence of interview screens 432 to the UI for presentation to the user. Visual assets may also include interview screen templates, which are blank or partially completed interview screens that can be utilized by the generation element to construct an interview screen 432 on the fly during runtime in the event that an appropriate pre-programmed or pre-determined interview screen or other visual asset is not available or cannot be identified by the interview screen management element. The following exemplary pseudocode describes system components and data described above:

Suggestion Resolution Element
// Take a suggestion and consult the behavior configuration to
// decide which ones the UI will handle
Suggestions=Get_suggestions_from_TLA;
New_list=Rank_and_Filter(Suggestions, Configuration_File);
Generation Element
For each item in New_list
UI_asset=Flow_View_Manager(item);
If UI_asset==NULL // if Flow_View_Manager does not have any ready
to go asset for the item
Template=Get_Template(item) // identify a template based on the item e.g. its type
UI_asset=Construct_UI_Asset(Template, item)
End
End
Interview Screen Management Element
Provide look-up capability to return UI asset (flow/view) if there is any, for given model field For ease of explanation and illustration, reference is made to UI controller 430, which, given the use of data structures described herein, permits UI controller 430 to be loosely connected or even divorced from the tax logic agent 410 and tax calculation engine 480 and the data used in the tax calculations that is stored in shared data store 440.

Figure 7:
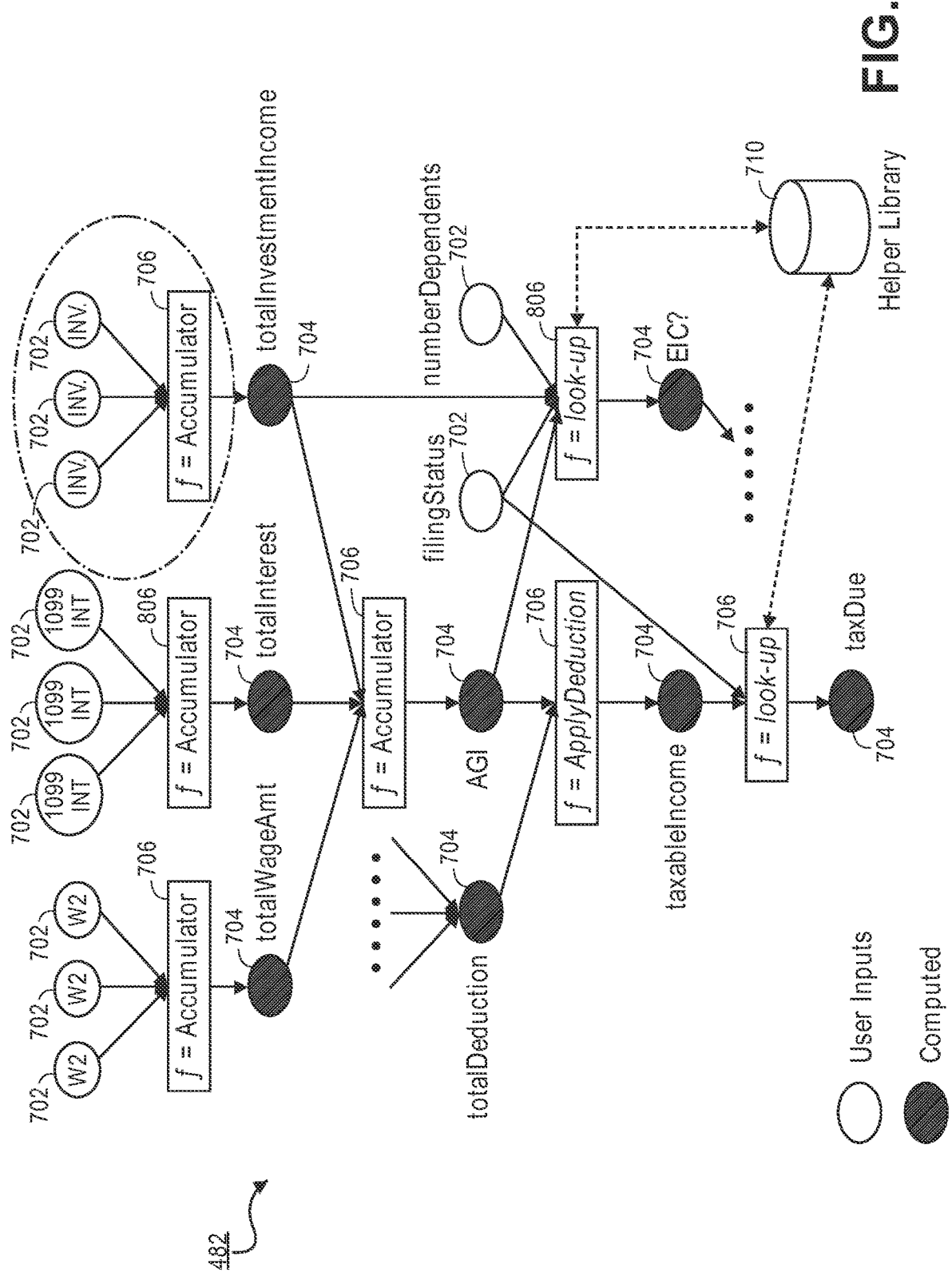
FIG. 7 illustrates an example of a calculation graph that is populated with runtime data and that includes input nodes, function nodes and result nodes.

With continuing reference to FIGS. 4B and 7, tax calculation engine 480 reads current runtime data 442 from shared data store 440, and uses this data as inputs into respective nodes of one or more calculation graphs 482. Respective results or values are calculated with associated functions that are executed with the input data. New or resulting data is written back by tax calculation engine 480 to shared data store 440 for subsequent reading by tax logic agent 410. For example, if runtime data 442 received thus far includes wages and interest earned from two savings accounts, a function for calculating Adjusted Gross Income (AGI) would sum this wage and interest data, and the resulting AGI value (based on the runtime data received thus far) is written back to the shared data store. As other types of AGI data are received or imported, tax calculation engine 480 will run calculation graphs 482 again to calculate a new AGI value, which would then be stored to shared data store 440.

FIG. 7 illustrates one example of a tax calculation graph 482. Tax calculation graph 482 semantically describes data dependent tax operations that used perform a tax calculation in accordance with the tax code or tax rules. Tax calculation graph 482 in FIG. 7 is a simplified view of data dependent tax operations that are used to determine the taxes Due (taxDue) based on various sources of income, deductions, exemptions, and credits. Tax calculation graph 482 is a type of directed graph and, in most situations relevant to tax calculations, is a directed acyclic graph that encodes the data dependencies amongst tax concepts or topics.

In FIG. 7, various nodes are input nodes 702. Examples of input nodes 702 in this particular example include data obtained from W-2 forms, data obtained from 1099-INT forms, data obtained from other investment income (INV), filing status, and number of dependents. Typically, though not exclusively, input nodes 702 are populated with user inputs. That is to say the user taxpayer will enter this information from a user interface as described herein. In other embodiments, however, nodes 702 may be populated with information that is automatically obtained by the tax preparation software. For example, in some embodiments, tax documents may be imaged or scanned with relevant data being automatically extracted using Optical Character Recognition (OCR) techniques. In other embodiments, prior tax returns may be used by the tax preparation software to extract information (e.g., name, potential dependents, address, and social security number) which can then be used to populate nodes 702. Online resources such as financial services websites or other user-specific websites can be crawled and scanned to scrape or otherwise download tax related information that can be automatically populated into nodes 702. Additional third party information sources such as credit bureaus, government databases, and the like can also be used by the tax preparation software to obtain information that can then be populated in to respective nodes 702.

In still other embodiments, values for nodes 702 may be derived or otherwise calculated. For example, while the number of dependents may be manually entered by a taxpayer, those dependent may not all be "qualifying" dependents for tax purposes. In such instances, the actual number of "qualified" dependents may be derived or calculated by the tax preparation software. In still other embodiments, values for nodes 702 may be estimated.

Still other internal nodes referred to as functional nodes 704 semantically represent a tax concept and may be calculated or otherwise determined using a calculation function 706, which generates a calculation result that is to be utilized in the electronic tax return (as opposed to other intermediate "functions" described below such as a hash function). Functional node 704 and the associated function 706 define a particular tax operation. For example, as seen in FIG. 7, operation refers to total wage income and is the result of the accumulator function 706 summing all W-2 income from input nodes 702. Functional node 704 may include a number in some instances. In other instances, the functional node 704 may include a response to a Boolean expression such as "true" or "false." Functional nodes 704 may also be constant values in some instances. Some or all of these functional nodes 704 may be labeled as "tax concepts" or "tax topics." The combination of a functional node 704 and its associated function 706 relate to a specific tax operation as part of the tax topic.

Interconnected function nodes 704 containing data dependent tax concepts or topics are associated with a discrete set of functions 706 that are used to capture domain specific patterns and semantic abstractions used in the tax calculation. The discrete set of functions 706 that are associated with any particular function node 704 are commonly reoccurring operations for functions that are used throughout the process of calculating tax liability. For example, examples of such commonly reoccurring functions 706 include copy, capping, thresholding (e.g., above or below a fixed amount), accumulation or adding, look-up operations (e.g., look-up tax tables), percentage of calculation, phase out calculations, comparison calculations, exemptions, exclusions, and the like.

In one embodiment, the entire set of functions 706 that is used to compute or calculate a tax liability is stored within a data store 710 which in some instances may be a database. The various functions 706 that are used to semantically describe data connections between function nodes 704 can be called upon by the tax preparation software for performing tax calculations. Utilizing these common functions 706 greatly improves the efficiency of the tax preparation software can be used by programmer to more easily track and follow the complex nature of the ever-evolving tax code. The common functions 706 also enables easier updating of the tax preparation software because as tax laws and regulations change, fewer changes need to be made to the software code as compared to prior hard-wired approaches.

Tax calculation graph 482 and the associated function nodes 704 and functions 706 can be tagged and later be used or called upon to intelligently explain to the user the reasoning behind why a particular result was calculated or determined by the tax preparation software program. Functions 706 can be de-coupled from a specific narrow definition and instead be associated with one or more explanations. Examples of common functions 706 found in tax legislation and tax rules include the concepts of "caps" or "exemptions" that are found in various portions of the tax code. One example of a "cap" is the portion of the U.S. tax code that limits the ability of a joint filer to deduct more than $3,000 of net capital losses in any single tax year. There are many other instances of such caps. An example of an "exemption" is one that relates to early distributions from retirement plants. For most retirement plans, early distributions from qualified retirement plans prior to reaching the age of fifty nine and one-half (59½) require a 10% penalty. This penalty can be avoided, however, if an exemption applies such as the total and permanent disability of the participant. Other exemptions also apply. Such exemptions are found throughout various aspects of the tax code and tax regulations.

Function 706 may also include any number of mathematical or other operations. Examples of functions 706 include summation, subtraction, multiplication, division, and comparisons, greater of, lesser of, at least one of, calling of look-ups of tables or values from a database 710 or library as is illustrated in FIG. 7. It should be understood that function nodes 704 in tax calculation graph 482 may be shared in some instances. For example, AGI is a reoccurring tax concept that occurs in many places in the tax code. AGI is used not only for the mathematical computation of taxes is also used, for example, to determine eligibility of certain tax deductions and credits. The AGI function node 704 may be found in multiple locations within the tax calculation graph 482. Taxable income is another example of such a function node 704.

Thus, in contrast to the rigidly defined user interface screens used in prior iterations of tax preparation software, embodiments of the current invention provide tax preparation software that runs on computing devices that operates on a new construct in which tax rules and the calculations based thereon are established in declarative data-structures, namely, completeness graph(s) and tax calculation graph(s). Use of these data-structures permits the user interface to be loosely connected or even divorced from the tax calculation engine and the data used in the tax calculations. Tax calculations are dynamically calculated based in tax data derived from sourced data, estimates, or user input. Smart tax logic agent 410 running on set of rules 461 can review current run time data 442 and evaluate missing data fields and propose suggested questions 411 to be asked to a user to fill in missing blanks. This process can be continued until completeness of all tax topics reflected in decision tables 460 has occurred. An electronic return can then be prepared and filed with respect to the relevant taxing jurisdictions.

In the embodiment illustrated in FIG. 4, UI controller 430 also includes or utilizes an identity generator module that generates an identifier (ID) for an instance (I) to be generated based on schema 446 of shared data store 440. Thus, embodiments involve an ID generator that generates identifier (I) for instance (I) so that instances can be uniquely identified and non-binding suggestions 411 the same term or element of schema 446 can be distinguished.

For example, if a taxpayer has multiple Form W-2s for different jobs, or multiple 1099-INT forms for interest earnings from different financial institutions, embodiments are utilized to uniquely identify and distinguish these two different forms for the same topic. In this manner, calculation engine 480, tax logic agent 410, and UI controller 430, initially and when processing non-binding suggestions 411, can uniquely identify the proper Form W-2 or Form 1099-INT that is the subject of a calculation result 481 or suggestion 411, for example, and which ones are not.

Having described system 400 components and how they cooperatively operate to prepare an electronic tax return, embodiments involving a temporary data engine 435 and placeholders 437 are described with reference to FIGS. 8-22.

Figure 8:
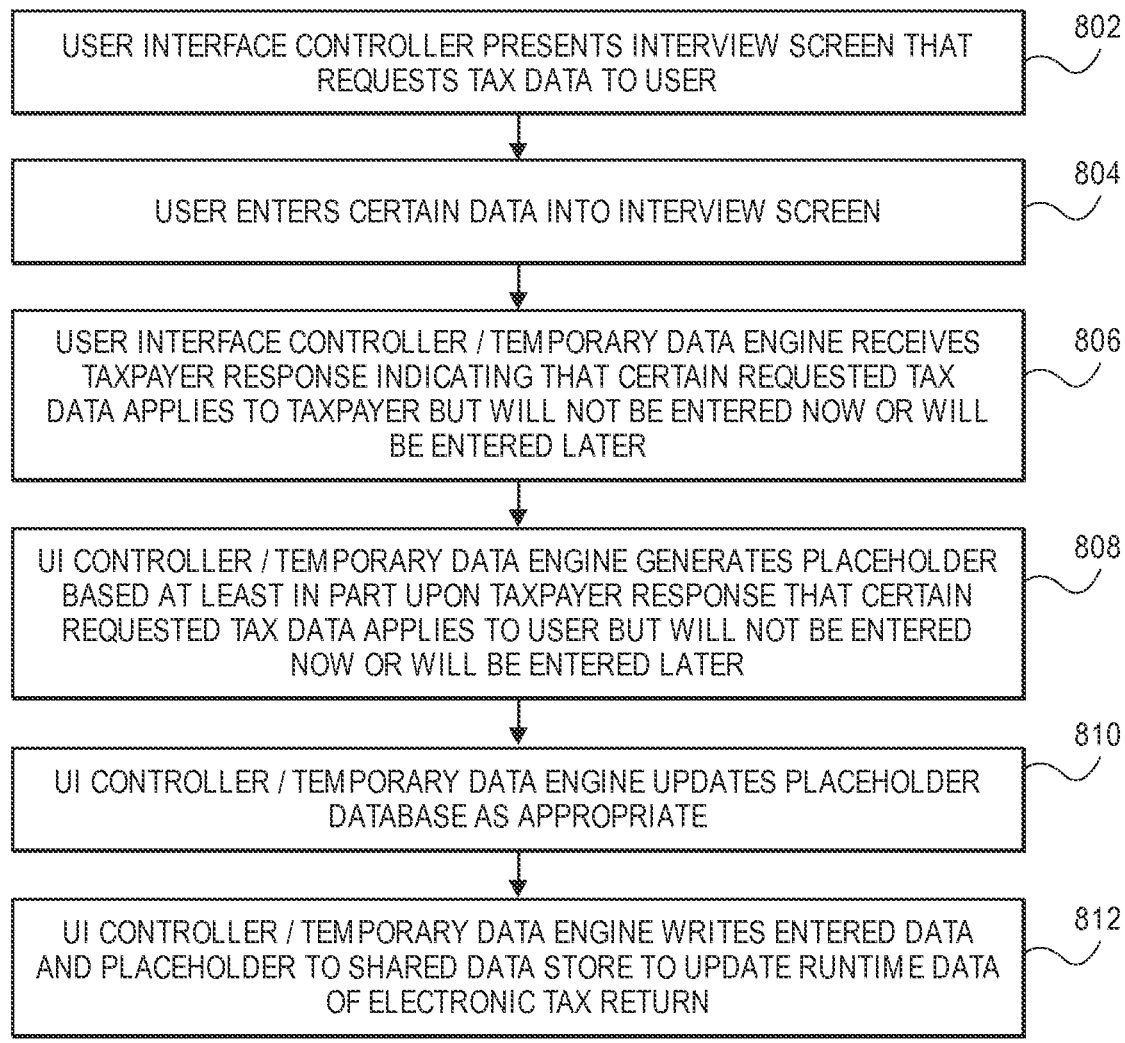
FIG. 8 is a flow diagram illustrating processing by a user interface controller including a temporary data engine that utilizes placeholders for when a user response indicates that certain data is not being entered in response to an interview screen but is applicable to the user's electronic tax return.

Referring to FIG. 8, at 802, UI controller 430 presents interview screen 432 to user, e.g., based on a non-binding suggestion 411 generated by tax logic agent 410 410. Interview screen 432 includes various elements for user input, such as one or more fields, boxes to be checked/unchecked, answers to Y/N questions or selection of an icon or user interface element concerning data, a topic or tax situation. For ease of explanation, reference is made to fields of interview screen 432 that are to be populated with data provided by a user. Further, while interview screens 432 may involve various types of data or topics (e.g. personal information, income, deductions), and specific types thereof (e.g., name, address, social security number; W2 data and taxes withheld, and deductions for mortgage interest and points), reference is made to personal information data such as a user's name, date of birth, social security number, address, or such information about other taxpayers or dependents that are to be included in the tax return.

At 804, user responds 432resp to interview screen request 432req by entering certain data into respective fields 433, while at 806, certain fields 433 remain empty and are not populated with requested data. Continuing with the example above, assume that the user's name has been entered, but not the user's SSN or other personal or sensitive information. Thus, some fields 433 of the interview screen 432 have been populated, whereas others have not. However, rather than merely skipping over these fields 433 and assuming that the data or topic does not apply, according to embodiments, interview screens 432 include other options for data that applies but has not been entered. These response options may indicate that the requested data applies to the user, or that the user has the requested data, but the requested data will not be entered now, or that the user does not know or does not have the requested data at this time. For example, requested data may be in a tax document that the taxpayer does not have at the moment or has not received.

At 808, temporary data engine 435 generates a placeholder 437 in response the user's response 432resp indicating that certain data applies to the user but has not been entered. Placeholder 437 may take various forms depending on the embodiment implemented.

According to one embodiment, placeholder 437 is pseudodata 437p ("p" referring to pseudodata) or, in other words, a temporary data substitute for the unentered data and that may be in the same format as the unentered data.

Continuing with the above examples involving SSN, if the user decides not to enter SSN but indicates that the user has a SSN, placeholder 437 may be in the form of SSN pseudodata 437, or a "dummy" SSN, e.g., a generic SSN such as 555-55-5555 or a SSN that is not utilized and that can be used for various taxpayers. Further, while schema 446 constraints may specify that data entered by the user must be numerical data (as opposed to letters, or a combination of letters and numbers), in cases in which the temporary data engine 435 is generating a placeholder 437 for unentered data, schema 446 may allow a temporary placeholder 437 to be alpha data (e.g., ABC-DE-FGHI), or alpha-numeric data (e.g. ABC-55-5555) for purposes of temporarily populating a field until the user's SSN is entered. Thus, while the placeholder 437 data is still in the same format in that it includes (3 data elements-2 data elements-4 data elements), different types of pseudodata 437p content may be utilized by configuring the schema 446 to account for these temporary data entries by temporary data engine 435. Temporary data engine 435 can utilize a generic pseudodata placeholder 437p that is applicable for multiple or all users, or utilize a random number/letter generator for this purpose. Thus, in these embodiments, other system components, namely calculation engine 480 and tax logic agent 410, may not recognize that the pseudodata 437p is temporary data and instead may proceed with calculations and logic determinations based on its understanding that a field for SSN has been populated with SSN data that is stored in shared data store 440, or an instance has been generated from a SSN schema 446 element and includes data for SSN.

According to another embodiment, placeholder 437 is a flag, bit, tag or other indicator 437i ("i" referring to indicator of temporary or placeholder data) that certain data applies to the user but has not been entered yet. While FIG. 4B generally refers to "TAG" for an instance instantiated from a schema 446 element, it will be understood that there may be one or multiple such tags, one of which may be for placeholder indicator 437 437i. For example, a Y/N bit may be used to indicate "Y—there is a SSN to be entered" or "N—there is not a SSN to be entered." Thus, rather than having to generate or select pseudodata 437p for unentered data, temporary data engine 435 can instead set a flag, bit or tag 437i in shared data store 440 for schema 446 element of unentered data. More specifically, an instance of schema 446 element "SSN" can be generated and tagged 437i to indicate that a SSN applies but has yet to be entered. Thus, in these embodiments, other system components, namely calculation engine 480 and tax logic agent 410, may recognize that the instance data for "SSN" schema element is temporary data based on the tag 437i, and when performing calculations and logic determinations, write results with such tag 437i or generate non-binding suggestion 411 with such tag 437i. Thus, these components can indicate that the calculation result 481 or non-binding suggestion 411 is based at least in part upon unentered data and an understanding the type of data, topic or tax situation applies to the user.

In yet other embodiments, placeholder 437 may be a combination of pseudodata 437p and an indicator 437i such as a flag, bit or tag.

With continuing reference to FIG. 8, at 810, UI controller 430/temporary data engine 435 may update a database 434 for placeholders 437 and associated data as appropriate, e.g., in cases in which pseudodata 437p is utilized without a flag, bit or tag or indicator 437i, and at 812, UI controller 430/temporary data engine 435 writes placeholder 437 to shared data store 440. An instance of the corresponding schema 446 element is generated and includes a placeholder 437 in the form of pseudodata 437p and/or a temporary tag or indicator 437i Further aspects of embodiments involving placeholders 437 in the form of pseudodata 437p are described with reference to FIGS. 9-12, further aspects of embodiments involving placeholders 437 in the form of flag, bit or tag indicators 437i are described with reference to FIGS. 13-16, and further aspects of embodiments involving placeholders 437 in the form of a combination of pseudodata 437p and a flag, bit or tag indicator 437i are described with reference to FIGS. 17-20.

Figure 9:
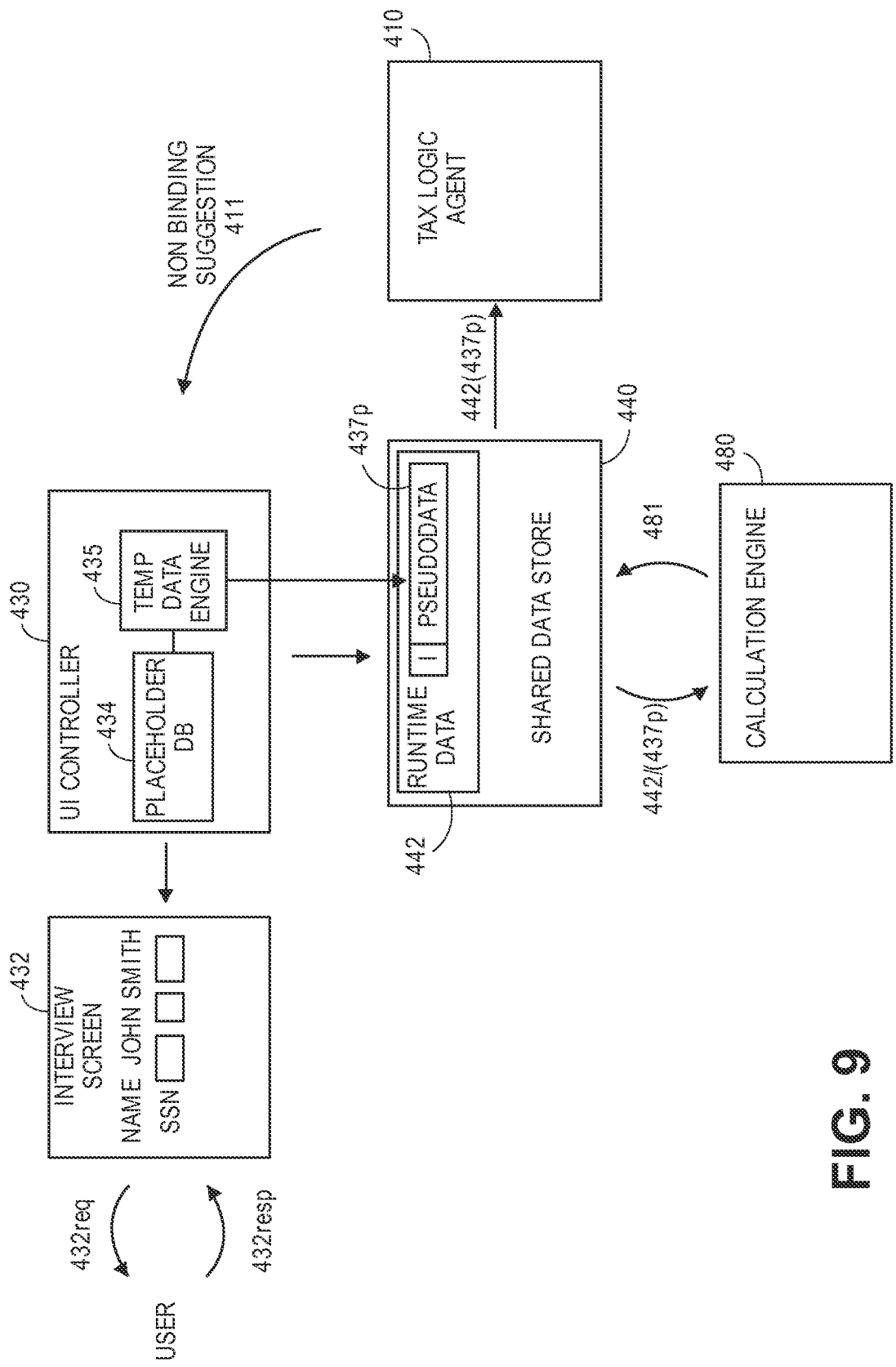
FIG. 9 is a block diagram of a computerized modular tax preparation system constructed according to one embodiment that utilizes placeholders in the form of pseudodata when processing user responses indicating that certain data is not entered but is applicable to the user's electronic tax return.

Referring to FIG. 9, according to one embodiment, placeholder 437 that is generated by temporary data engine 435 in response to a user response 432resp indicating that certain data applies to the user even though the data has not been entered is pseudodata 437p or a temporary substitute for unentered data.

Figure 10:
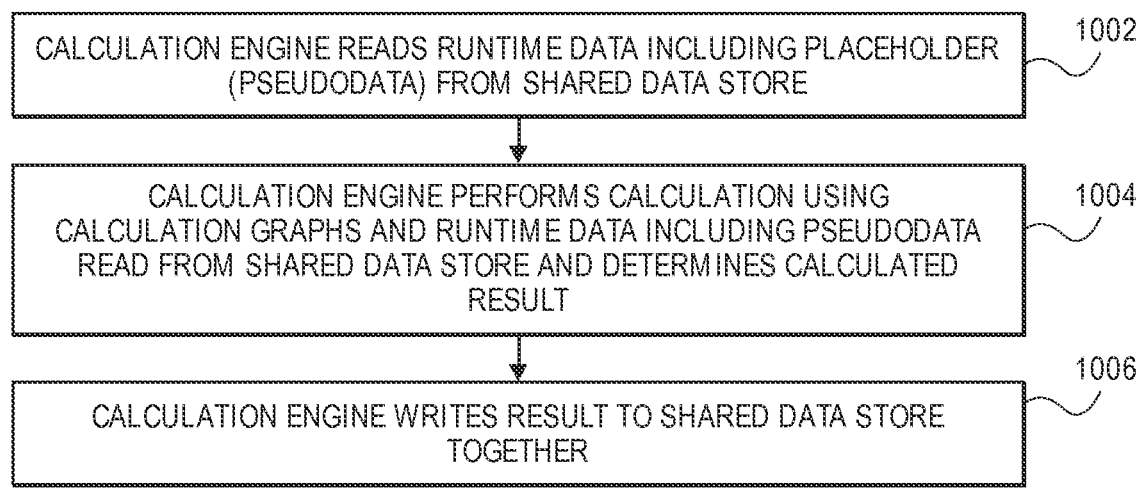
FIG. 10 is a flow diagram of a computer-implemented method performed by a calculation engine in connection with processing user responses indicating that certain data is not being entered but is applicable to the user's electronic tax return utilizing pseudodata placeholders.

Referring to FIG. 10, after pseudodata 437p is written to shared data store 440 by UI controller 430, at 1002, calculation engine 480 reads runtime data 442 including pseudodata 437p from shared data store 440, and at 1004, uses calculation graphs 482 and runtime data 442 to perform calculations or functions and determine calculation results 481. At 1006, calculation engine 480 writes result 481 to shared data 440. Thus, in this embodiment, without any indicator 437i that pseudodata 437p is temporary, placeholder 437 data, calculation engine 480 proceeds as if the requested data was entered by the user, generates a calculation result 481, and writes the result 481 back to shared data store 440 to update the runtime data 442.

Figure 11:
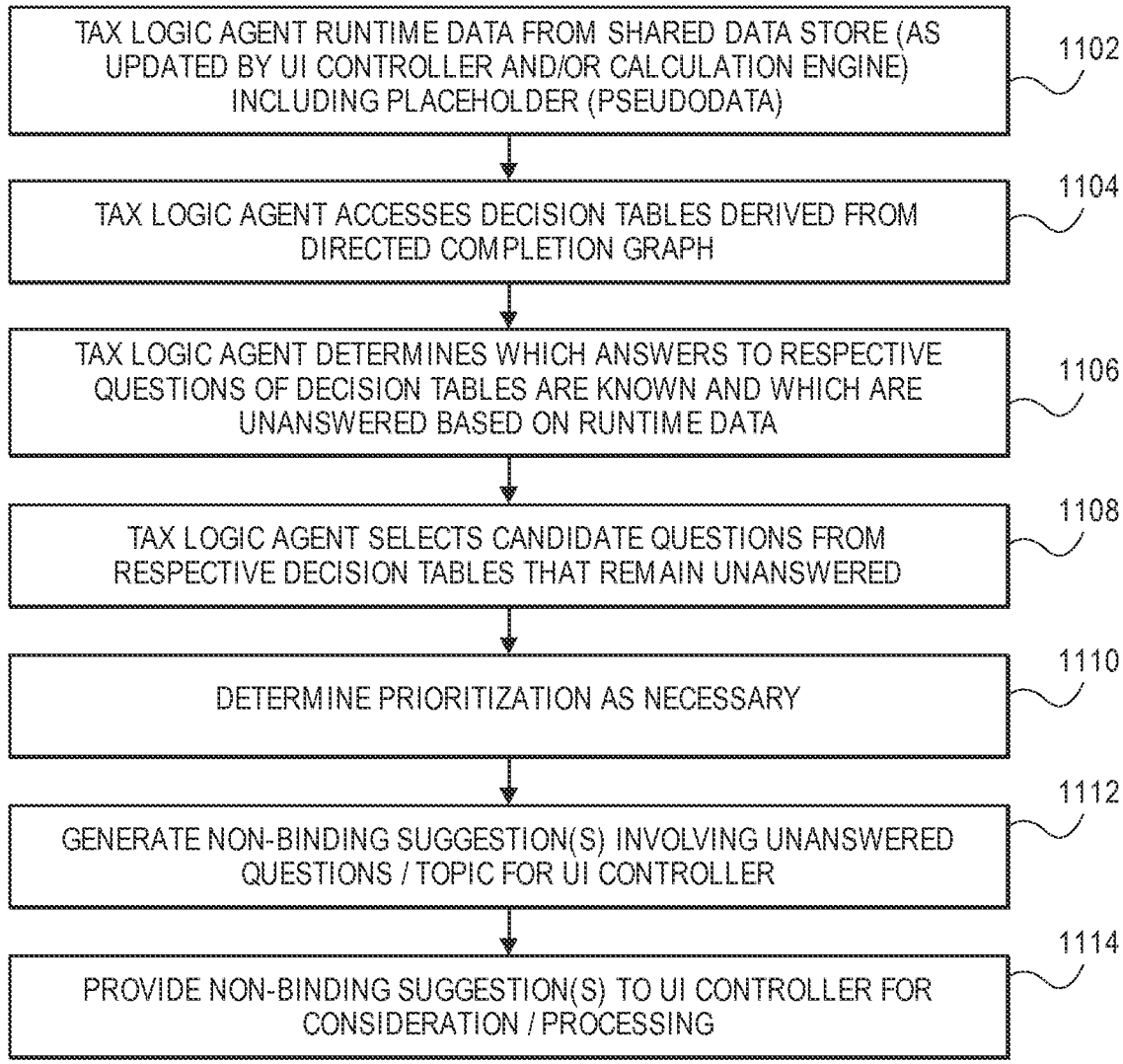
FIG. 11 is a flow diagram of a computer-implemented method performed by a tax logic agent in connection with processing user responses indicating that certain data is not being entered but is applicable to the user's electronic tax return utilizing pseudodata placeholders.

Referring to FIG. 11, tax logic agent 410 reads updated runtime data 442 (including pseudodata 437p generated or selected by temporary data engine 435 and any updates provided by calculation engine 480) and at 904, tax logic agent 410 accesses decision tables 460, determines which answers to respective questions 462 of decision table(s) 460 are known based on runtime data 442 at 906, and selects unanswered questions 462/topics are based at least in part upon runtime data 442 including the pseudodata 437p. Tax logic agent 410 selects candidate question from decision table(s) 460 that remain unanswered given runtime data 442. At 1110, tax logic agent 410 generates non-binding suggestions 411 involving unanswered questions and/or topics for UI controller 430, and at 914, non-binding suggestions 411 are provided to UI controller 430 for processing. Thus, tax logic agent 410 may generate non-binding suggestions 411 based on runtime data 442 that includes pseudodata 437p and/or based on a calculation result 481 determined based at least in part upon pseudodata 437p. Without an indicator 437i that pseudodata 437p is temporary, placeholder 437 data, tax logic agent 410 proceeds as if the requested data was entered by the user, generates a non-binding suggestion 411, and writes non-binding suggestion 411 to shared data store 440 to update the runtime data 442.

Figure 12:
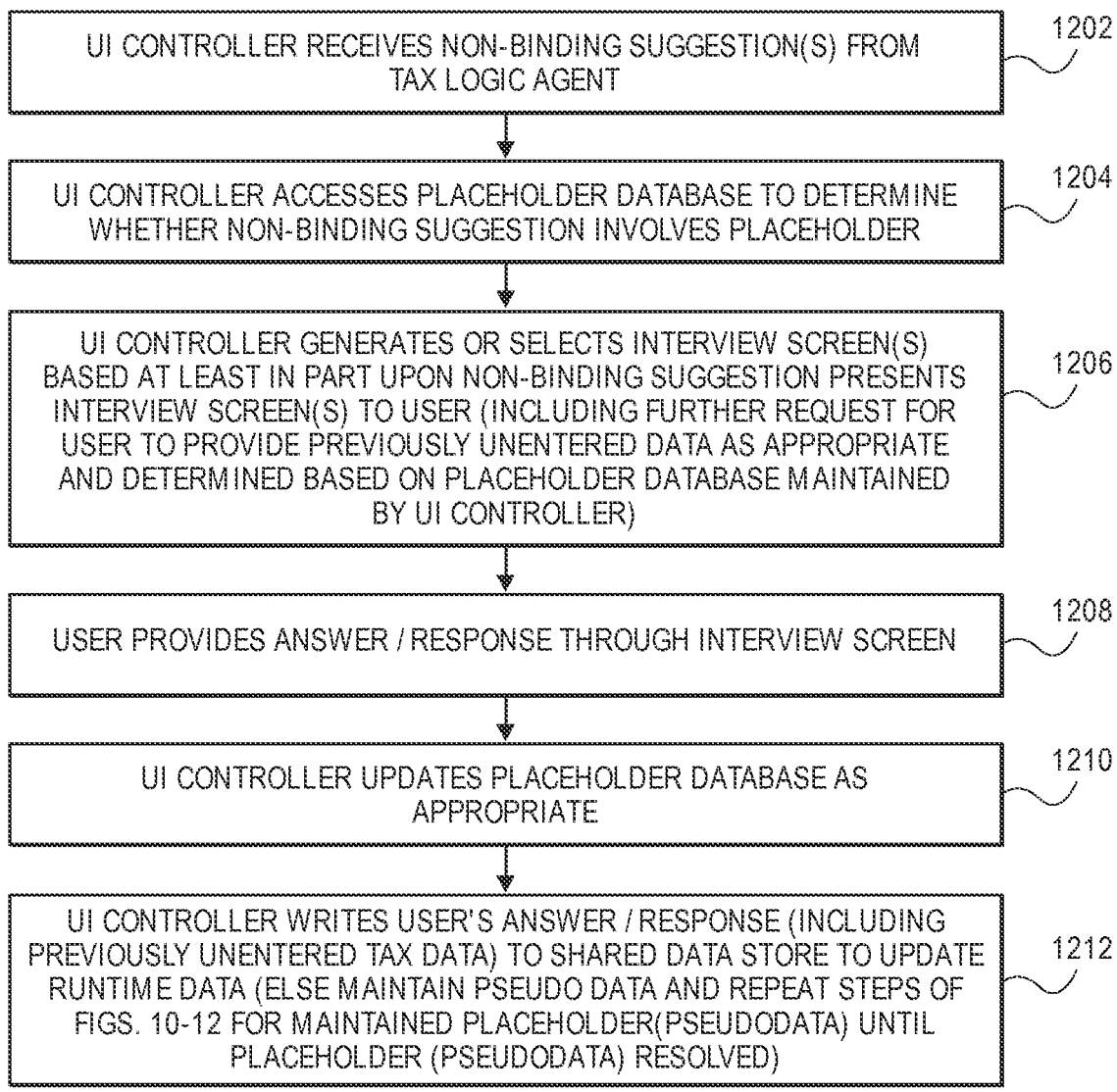
FIG. 12 is a flow diagram of a computer-implemented method performed by a user interface controller in connection with processing user responses indicating that certain data is not being entered but is applicable to the user's electronic tax return utilizing pseudodata placeholders.

Referring to FIG. 12, at 1202 UI controller 430 receives non-binding suggestion(s) 411 from tax logic agent 410, and at 1204, accesses placeholder database 434 to determine whether non-binding suggestion 411 involves placeholder 437. For example, placeholder database 434 may be consulted to identify a match of a term, question or topic of non-binding suggestion 411 that is based on the schema 446 and a matching or corresponding term associated with an unanswered question. As explained above, in this embodiment, UI controller 430 manages generation and processing of pseudodata placeholders 437p, and calculation engine 480 and tax logic agent 410 assume that pseudodata 437p is applicable such that calculation engine 480 and tax logic agent 410 do not need to be aware, and may not be aware in the absence of a separate indicator 437i which data is pseudodata 437p. Thus, UI controller 430 is not notified, via a non-binding suggestion 411, that certain data was previously identified as placeholder 437 data. Instead, UI controller 430 consults its placeholder database 434 to determine whether a non-binding suggestion 411 is based on a temporary placeholder 437.

At 1206, UI controller 430 generates or selects interview screen(s) 432 based at least in part upon non-binding suggestion 411 presents interview screen(s) 432 to user, and if a non-binding suggestion 411 is based on or involves temporary pseudodata 437p. According to one embodiment, if a non-binding suggestion 411 is based at least in part upon pseudodata placeholder 437p, UI controller 430 may prioritize such non-binding suggestions 411 in order to attempt to update runtime data 442 with the actual data before addressing other matters. In other embodiments, UI controller 430 waits to present interview screens 432 with requests for previously unentered data until later in the preparation process (e.g., when the user request an error check, or when the user reaches a certain point of the preparation process), or in response to a user input for such updates. Thus, when a non-binding suggestion 411 is processed, UI controller 430 may select or generate an interview screen 432 (such as the previously presented interview screen) to repeat the request 432req for unentered data, in response to which, at 1208, the user may provide an answer or response 432resp to the request 432req, providing data that previously served as the basis for the placeholder 437. UI controller 430 then updates placeholder database 434 as appropriate at 1210, e.g., by deleting the placeholder 437 from a list of placeholders 437, or indicating that placeholder 437 is no longer active since the user has now provided the necessary data. At 1212, UI controller 430 writes user's answer/response 432resp including previously unentered tax data to shared data store 440 to update runtime data 442, and processing by calculation engine 480 and tax logic agent 410 can be repeated on the updated runtime data. Otherwise, if previously requested data remains unanswered, steps of FIGS. 10-12 can be repeated until unentered data and pseudodata 437p are resolved.

Figure 13:
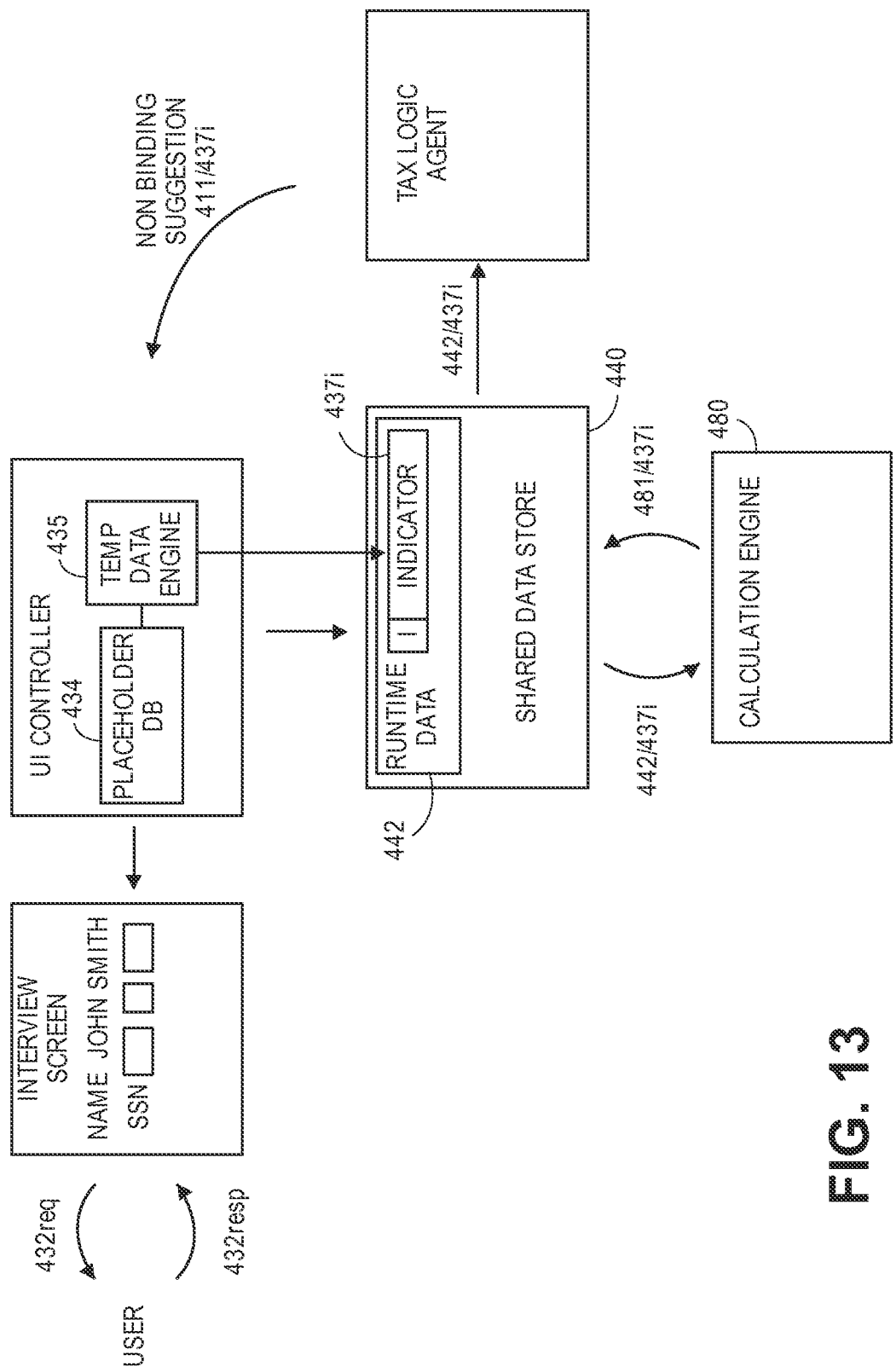
FIG. 13 is a block diagram of a computerized modular tax preparation system constructed according to one embodiment that utilizes placeholder data in the form of temporary data indicators or tags when processing user responses indicating that certain data is not entered but is applicable to the user's electronic tax return.

Referring to FIG. 13, according to one embodiment, the placeholder 437 that is generated by temporary data engine 435 in response to a user response 432resp indicating that certain data applies to the user even though the data has not been entered is a temporary data indicator 437i, such as a bit, flag or tag for associated runtime data 442 in shared data store 440.

Figure 14:
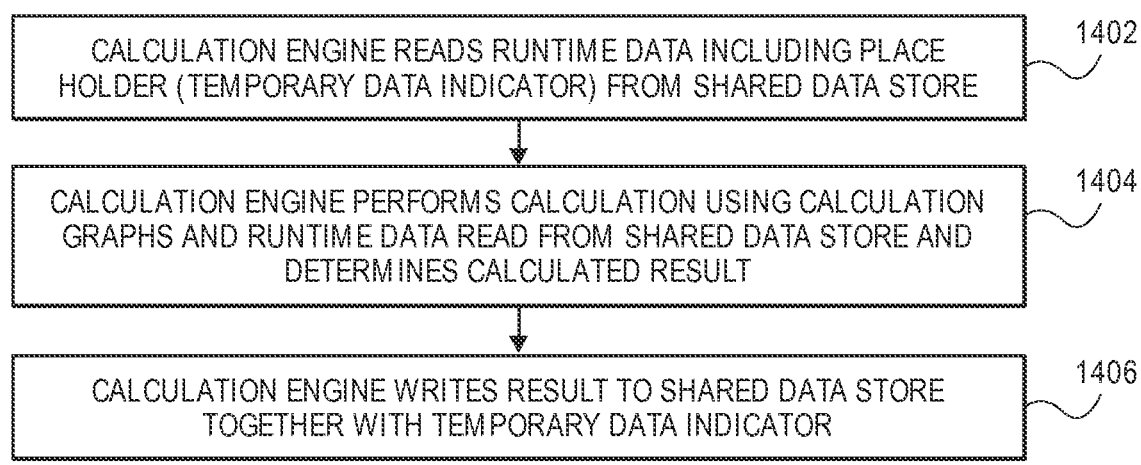
FIG. 14 is a flow diagram of a computer-implemented method performed by a calculation engine in connection with processing user responses indicating that certain data is not being entered but is applicable to the user's electronic tax return utilizing placeholder data in the form of temporary data indicators or tags.

Referring to FIG. 14, at 1402, calculation engine 480 reads runtime data 442 including place holder (temporary data indicator 437i) from shared data store 440, and at 1404, performs a calculation using calculation graphs 482 and runtime data 442 and determines calculated result 481. At 1406, a result 481 generated by the calculation engine 480 is written to shared data store 440 together with temporary data indicator 437i.

Figure 15:
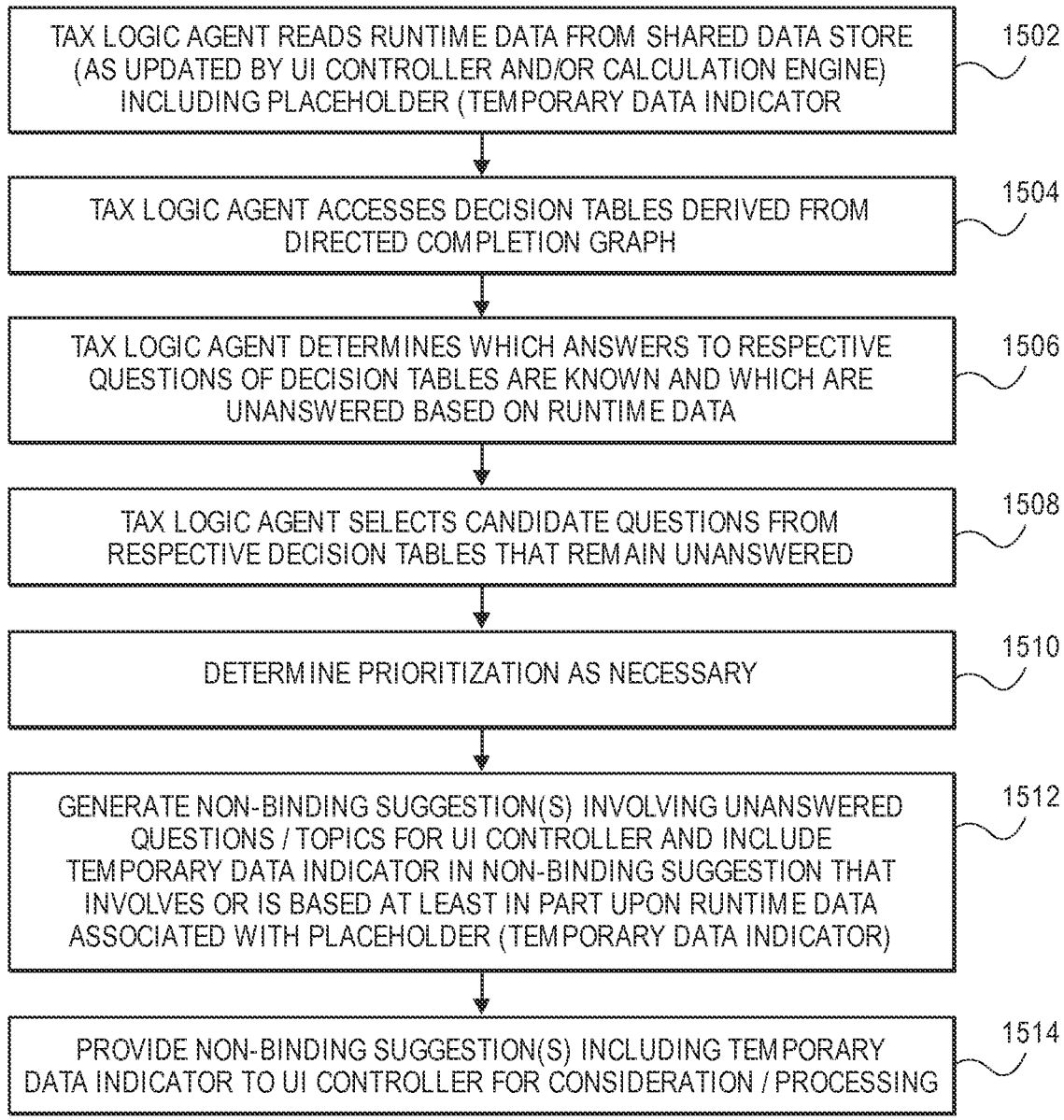
FIG. 15 is a flow diagram of a computer-implemented method performed by a tax logic agent in connection with processing user responses indicating that certain data is not being entered but is applicable to the user's electronic tax return utilizing placeholder data in the form temporary data indicators or tags.

Referring to FIG. 15, at 1502, tax logic agent 410 reads runtime data 442 from shared data store 440 (as updated by UI controller 430 and/or calculation engine 480) including temporary data indicator placeholder 437i. At 1504, tax logic agent 410 accesses decision tables 460 derived from directed completion graph 465. At 1506, tax logic agent 410 determines which answers to respective questions of decision tables 460 are known and which are unanswered based on runtime data 442, selects candidate questions from respective decision tables 460 that remain unanswered at 1508, and at 1510, generates non-binding suggestion(s) 411 involving unanswered questions/topics for UI controller 430. According to this embodiment, non-binding suggestion 411 that is generated based at least in part upon runtime data 442 associated with a bit, flag or tag 437i includes the bit, flag or tag 437i or other indication that non-binding suggestion 411 is based at least in part upon placeholder indicator 437i, and at 1514, non-binding suggestion 411 including temporary data indicator 437i is provided to UI controller 430 for consideration/processing.

Figure 16:
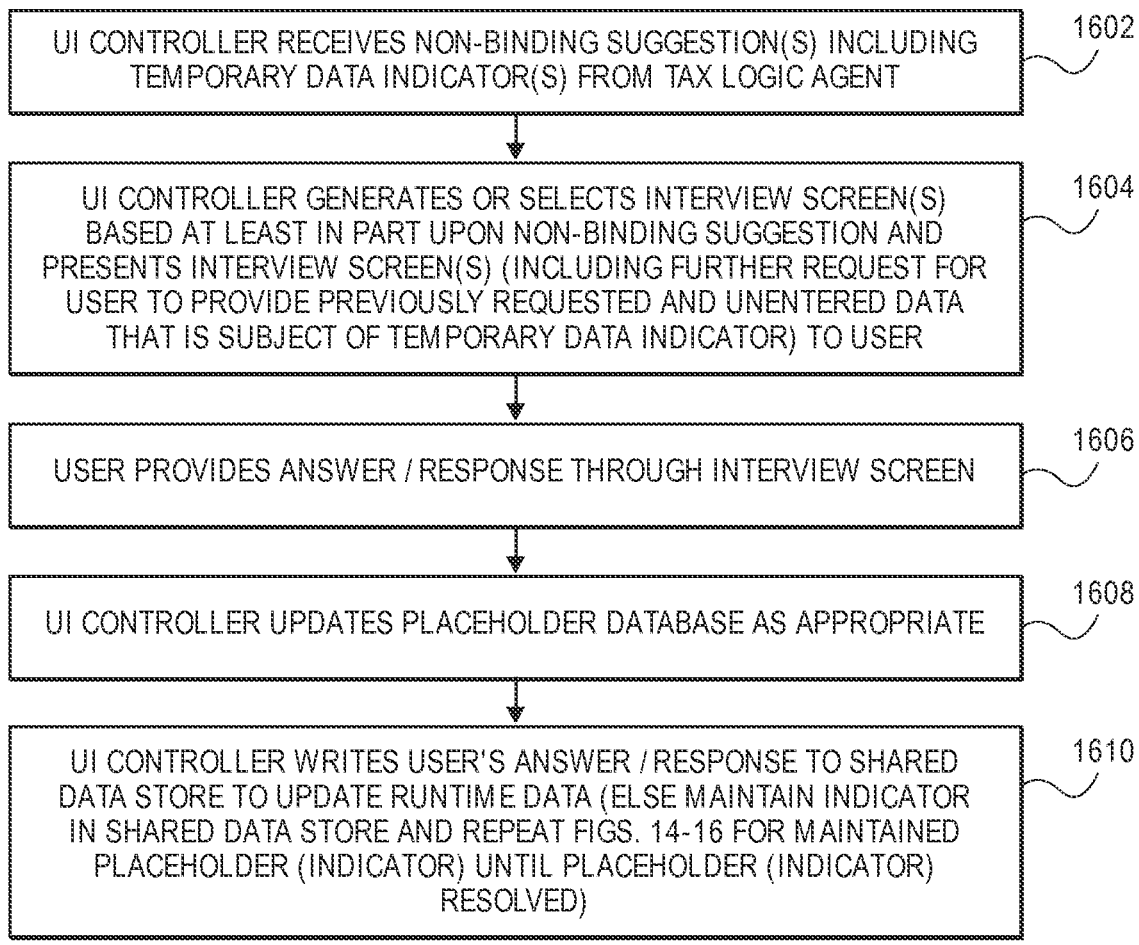
FIG. 16 is a flow diagram of a computer-implemented method performed by a user interface controller in connection with processing user responses indicating that certain data is not being entered but is applicable to the user's electronic tax return utilizing placeholder data in the form of temporary data indicators or tags.

Referring to FIG. 16, at 1602, UI controller 430 receives non-binding suggestion(s) 411 including temporary data indicator(s) 437i from tax logic agent 410, and at 1604, generates or selects interview screen(s) 432 based at least in part upon non-binding suggestion 411 and presents interview screen(s) 432 (including further request for user to provide previously requested and unentered data that is subject of temporary data indicator 437i) to user. At 1606, if user provides a response 432resp to a previously unanswered question that was the subject of placeholder 437, then at 1608, UI controller 430 updates placeholder database 434 as appropriate, and at 1610, writes user's answer/response 432resp to shared data store 440 to update runtime data 442 (else maintain indicator 437i in shared data store 440 and repeat FIGS. 14-16 for maintained indicator 437i until placeholder indicator 437i is resolved).

Figure 17:
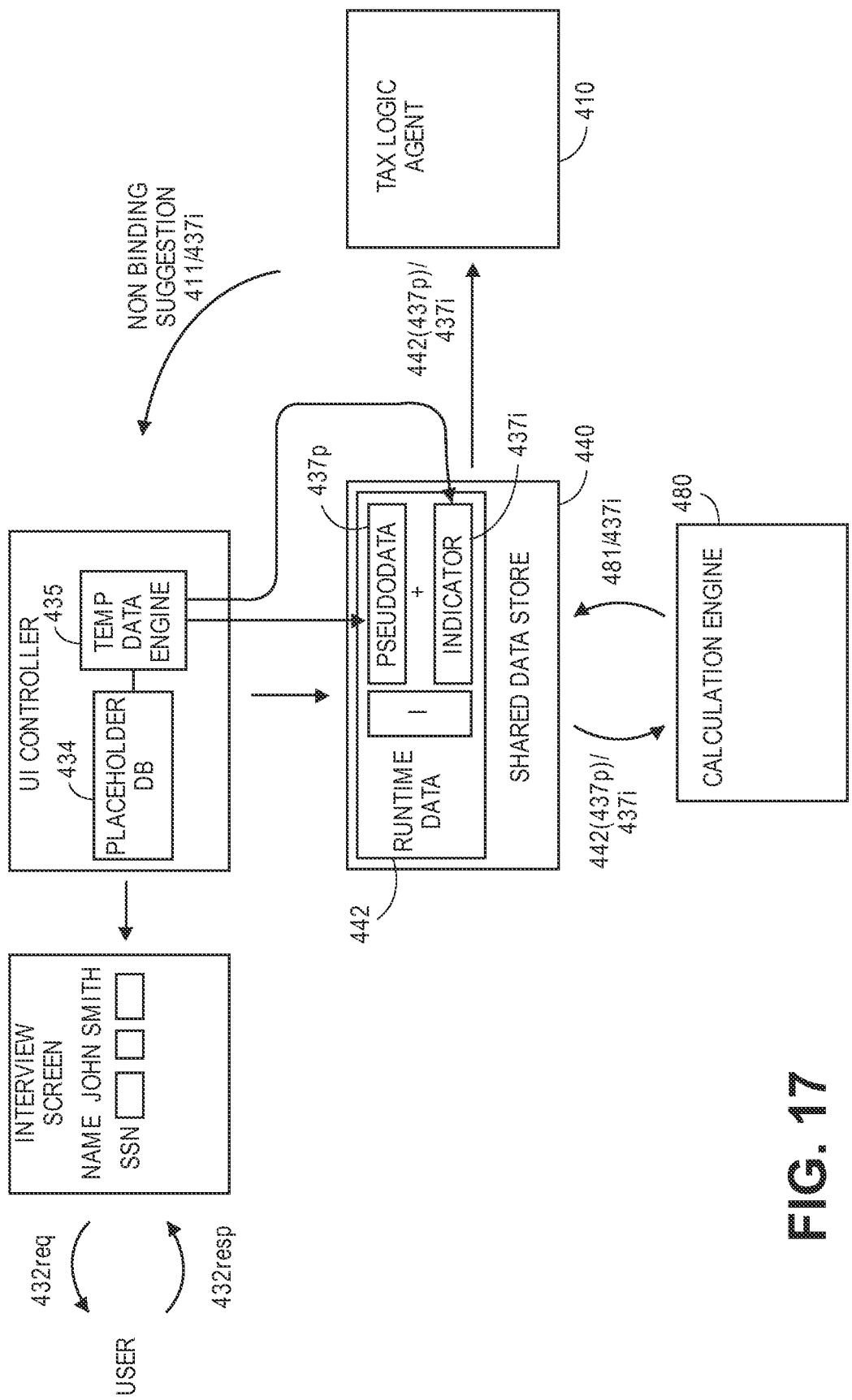
FIG. 17 is a block diagram of a computerized modular tax preparation system constructed according to one embodiment that utilizes placeholder data including pseudodata and temporary data indicators or tags when processing user responses indicating that certain data is not entered but is applicable to the user's electronic tax return.

Referring to FIG. 17, according to one embodiment, placeholder 437 that is generated by temporary data engine 435 in response to a user response 432resp indicating that certain data applies to the user even though the data has not been entered includes both pseudodata 437p and temporary data indicator 437i, such as a bit, flag or tag. Thus, UI controller 430 maintains placeholder database 434 and placeholder data 437 generated based on the user's response 432resp and unentered data is also stored in shared data store 440 with an associated temporary data indicator 437i.

Figure 18:
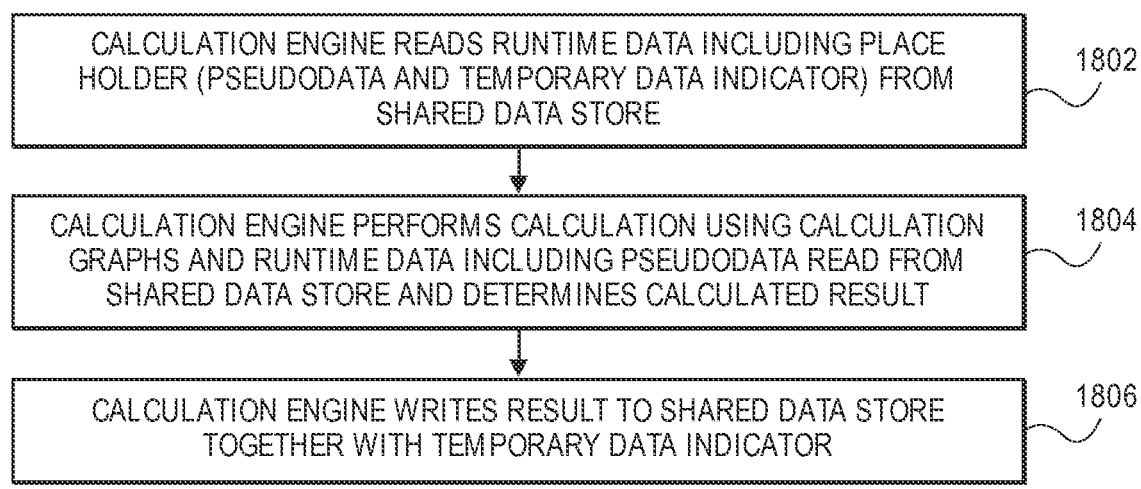
FIG. 18 is a flow diagram of a computer-implemented method performed by a calculation engine in connection with processing user responses indicating that certain data is not being entered but is applicable to the user's electronic tax return utilizing placeholder data including pseudodata and temporary indicators or tags.

Referring to FIG. 18, at 1802, calculation engine 480 reads runtime data 442 including place holder (pseudodata 437p and temporary data indicator 437i) from shared data store 440, and at 1804, calculation engine 480 performs a calculation using calculation graphs 482 and runtime data 442 including pseudodata 437p read from shared data store 442 and determines calculated result 481. At 1806, calculation engine 480 writes result 481 to shared data store 440 together with temporary data indicator 437i.

Figure 19:
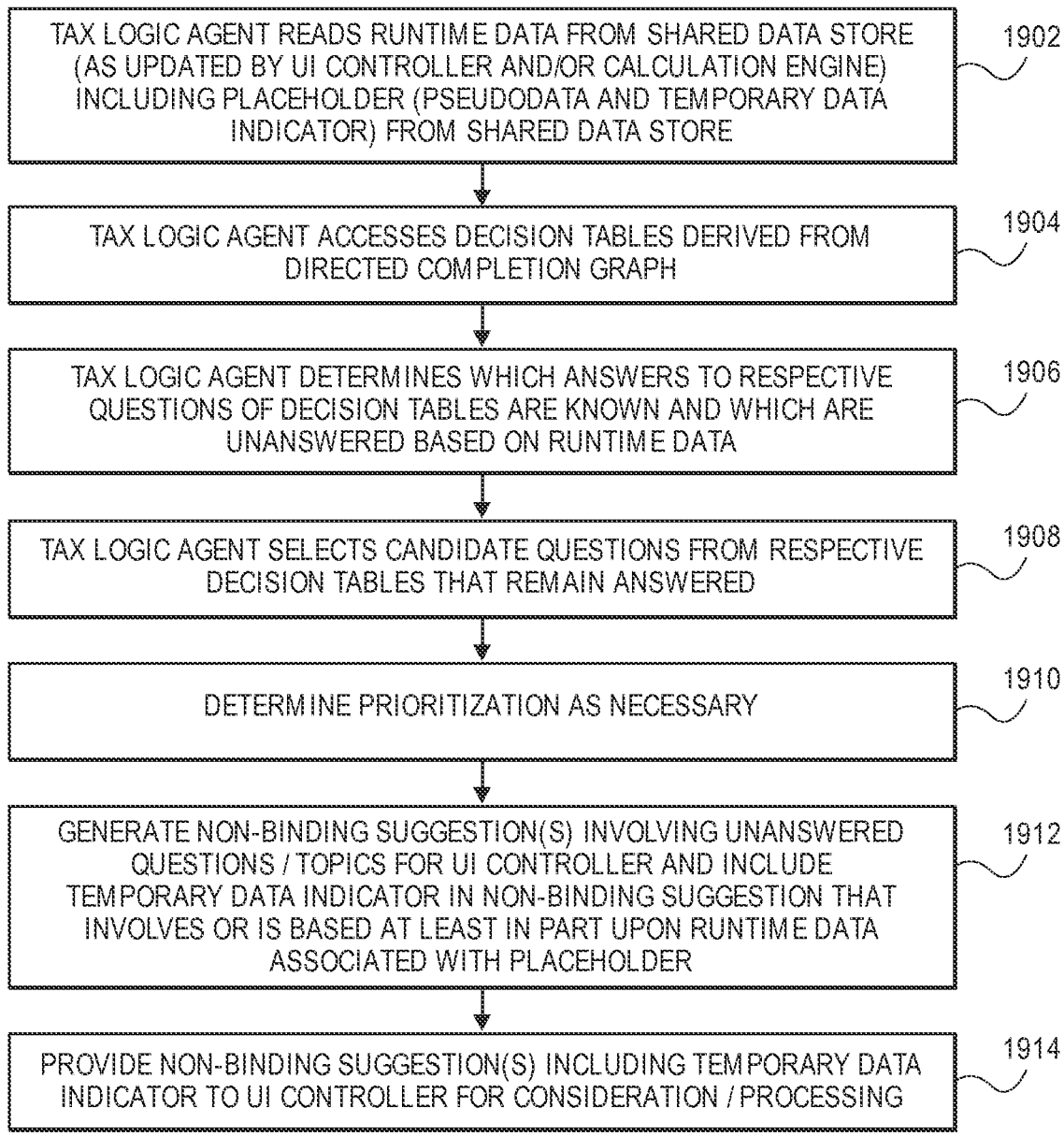
FIG. 19 is a flow diagram of a computer-implemented method performed by a tax logic agent in connection with processing user responses indicating that certain data is not being entered but is applicable to the user's electronic tax return utilizing placeholder data in the form of pseudodata and temporary indicators or tags.

Referring to FIG. 19, at 1902, tax logic agent 410 reads runtime data 442 from shared data store 440 (as updated by UI controller 430 and/or calculation engine 480) including placeholder 437 (pseudodata 437p and temporary data indicator 437i) from shared data store 440, and at 1904, tax logic agent 410 accesses decision tables 460 derived from directed completion graph 465. At 1906, tax logic agent 410 determines which answers to respective questions of decision tables 460 are known and which are unanswered based on runtime data 442. At 1908, tax logic agent 410 selects candidate questions from respective decision tables 460 that remain unanswered, and at 1910, generate non-binding suggestion(s) 411 involving unanswered questions/topics for UI controller 430 and includes temporary data indicator 437i in non-binding suggestion 411 that involves or is based at least in part upon runtime data 442 associated with placeholder 437. At 1912, tax logic agent 410 provides non-binding suggestion(s) 411 including temporary data indicator 437i to UI controller 430 for consideration/processing.

Figure 20:
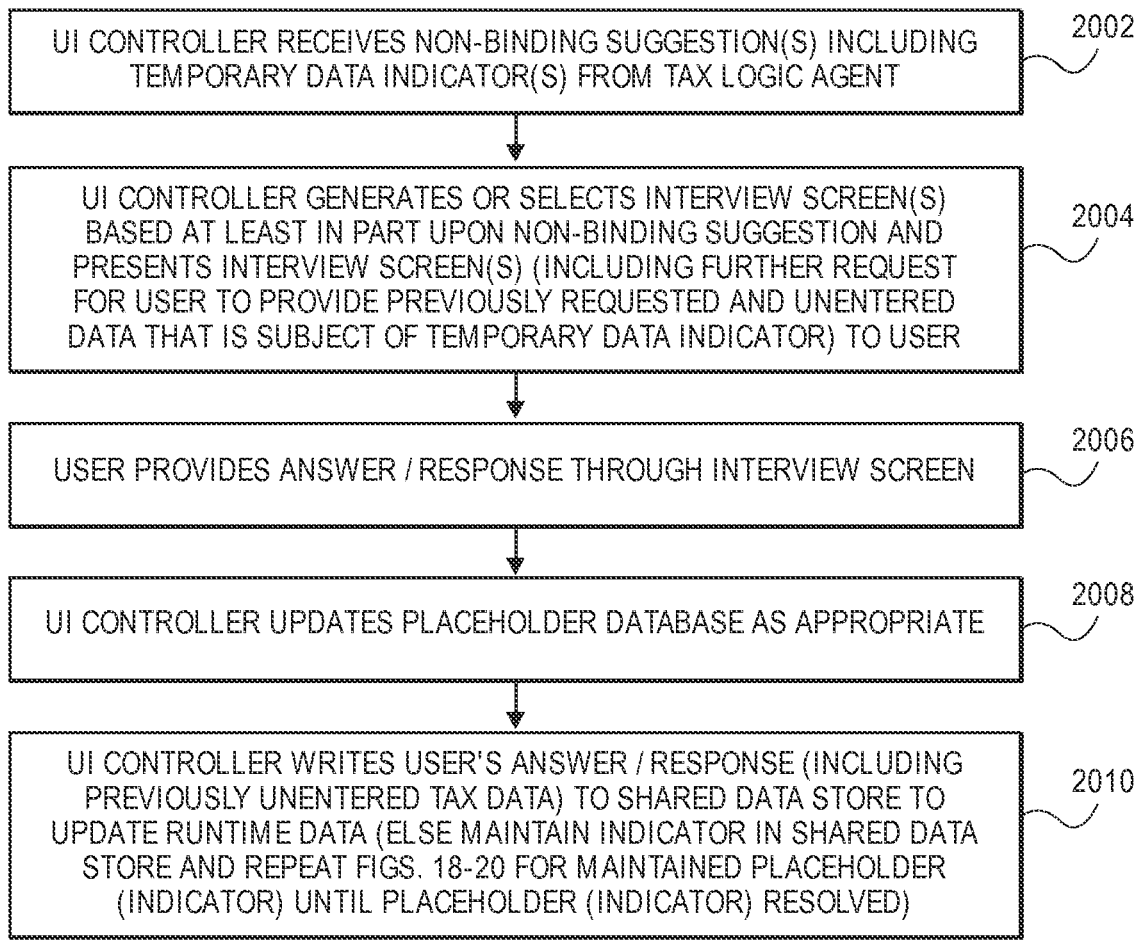
FIG. 20 is a flow diagram of a computer-implemented method performed by a user interface controller in connection with processing user responses indicating that certain data is not being entered but is applicable to the user's electronic tax return utilizing placeholder data in the form of pseudodata and temporary indicators or tags.
Figure 21:
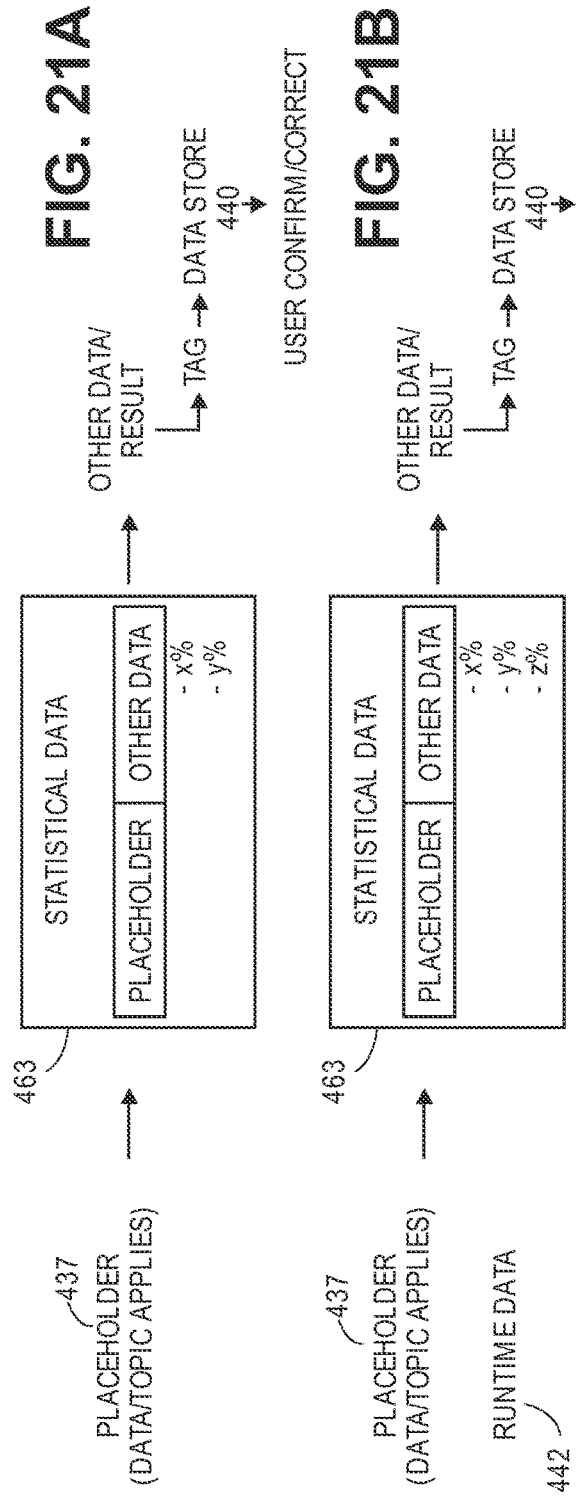
FIGS. 21A-D illustrate how placeholder data generated or selected in response to a user indication that certain data is not being entered but is applicable to the user's electronic tax return can be utilized to estimate or predict other electronic tax return data using statistical data and/or predictive models, alone or in conjunction with other runtime data of the electronic tax return.
Figure 22:
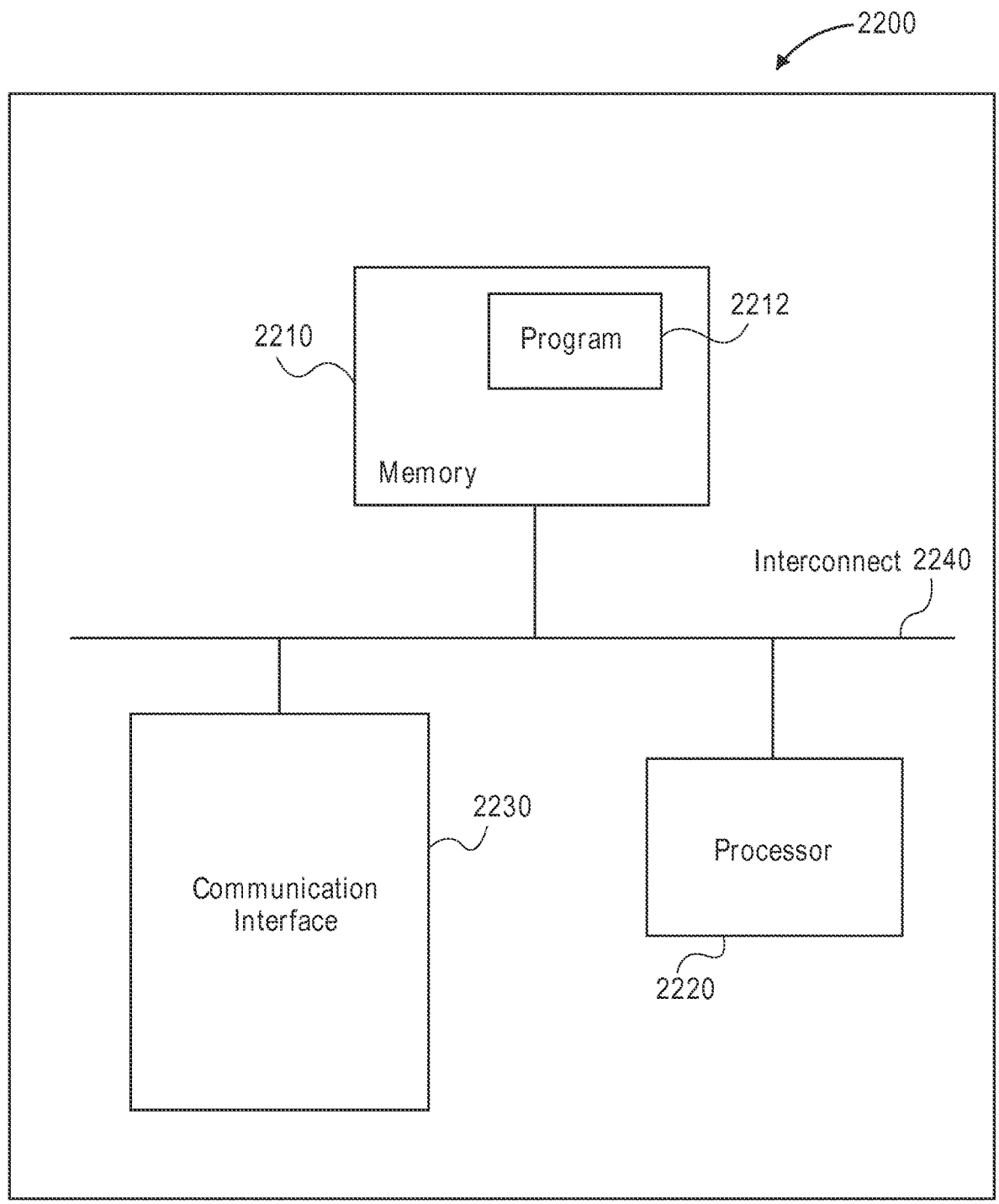
FIG. 22 is a block diagram of components of a computer system that may be programmed or configured to execute embodiments.

Referring to FIG. 20, at 2002, UI controller 430 receives non-binding suggestion(s) 411 including temporary data indicator(s) 437i from tax logic agent 410, and at 2004, generates or selects interview screen(s) 432 based at least in part upon non-binding suggestion 411 and presents interview screen(s) 432 (including further request 432req for user to provide previously requested and unentered data that is subject of temporary data indicator 437i). At 2006, when interview screen 432 involves previously requested and unentered data, user may provide an answer or response with the previously unanswered question or topic, through interview screen 432, and at 2008, can update the placeholder database 434 as appropriate. At 2010, UI controller 430 writes user's answer/response 432resp (including previously unentered tax data) to shared data store 440 to update runtime data 442 (else maintain indicator 437i in shared data store 440 and repeat FIGS. 18-20 for maintained placeholder indicator 437i until placeholder indicator 437i is resolved.

According to one embodiment, placeholder 437 data is utilized to determine or at least serves as a basis for, determining other data of the electronic tax return. For this purpose, other data of the electronic tax return may be estimated, assumed or predicted based at least in part upon statistical data 463 and/or predictive models 492 (as previously discussed with reference to FIG. 4B), which may involve placeholder 437 data as an input or factor. For this purpose, referring again to FIG. 4B, tax data estimation or prediction may be performed by tax logic agent 410 (e.g., in embodiments in which the tax logic agent 410 is aware of which data is placeholder 437 data via a temporary data indicator 437i. In these embodiments, statistical data 463 and/or predictive models 492 may be based on temporary or placeholder 437 data itself or in combination with other runtime data 442 that was entered by the user or imported from an electronic data source 450 as generally illustrated in FIGS. 21A-D. In other embodiments, temporary data engine 435 is in communication with or access statistical data 463 and/or predictive model 492 libraries for these purposes, accessing placeholder database 434 to identify temporary or placeholder 437 data, which is then utilized to estimate or predict other tax return data using the statistical data 463 and/or predictive models 492. Estimated or predicted data is written to the shared data store 440 with corresponding tags as appropriate to indicate that the data is an estimate or prediction and/or not based on entered or imported data or a calculation involving entered or imported data.

Statistical data 463 and/or predictive models 492 may also be utilized to invoke a scenario involving the requested but unentered data that is indicated by the user to be applicable to the user. For example, if a user does not remember certain information about a dependent, e.g., date of birth per the user's response 432resp, UI controller 430 may present certain scenario options, or multiple types of estimated or predicted data, based on statistics 463 and/or predictive models 492, and user may select a scenario from different available scenarios for the dependent. These various scenarios may be based on tax situations or experiences of other taxpayers that have profile characteristics similar to the taxpayer and that also have dependents. This may involve, for example, considering one more factors of the taxpayer that are known or entered such as age, marital status, income (whereas SSN and DOB may have been requested but not provided), in order to estimate an age of the dependent.

As another example, in which a DOB is requested but not provided but indicated to be pertinent per the user's response 432resp, if it is know that the ages of the taxpayer and spouse are within a certain range, then a determination can be made regarding an estimated age of a dependent. For example, if a taxpayer and spouse are younger than 30 years old and a date of birth of a dependent is not provided, statistical data 463 and/or predictive models 492 may generate an estimate or temporary result that a dependent is age 12 (under 13), whereas if a taxpayer and spouse are younger than 50, statistical data and/or predictive models may be used to generate an estimate or temporary result that a child is age 23 (under 24).

Such estimates or predictions also continue the tax return preparation process and maintain the engagement of the user rather than resulting in an interruption and user frustration. The estimated or predicted data is tagged accordingly, and the user is presented with interview screens at a later time to confirm or correct the estimated or predicted data, and any remaining previously requested and unentered data.

Figure 23:
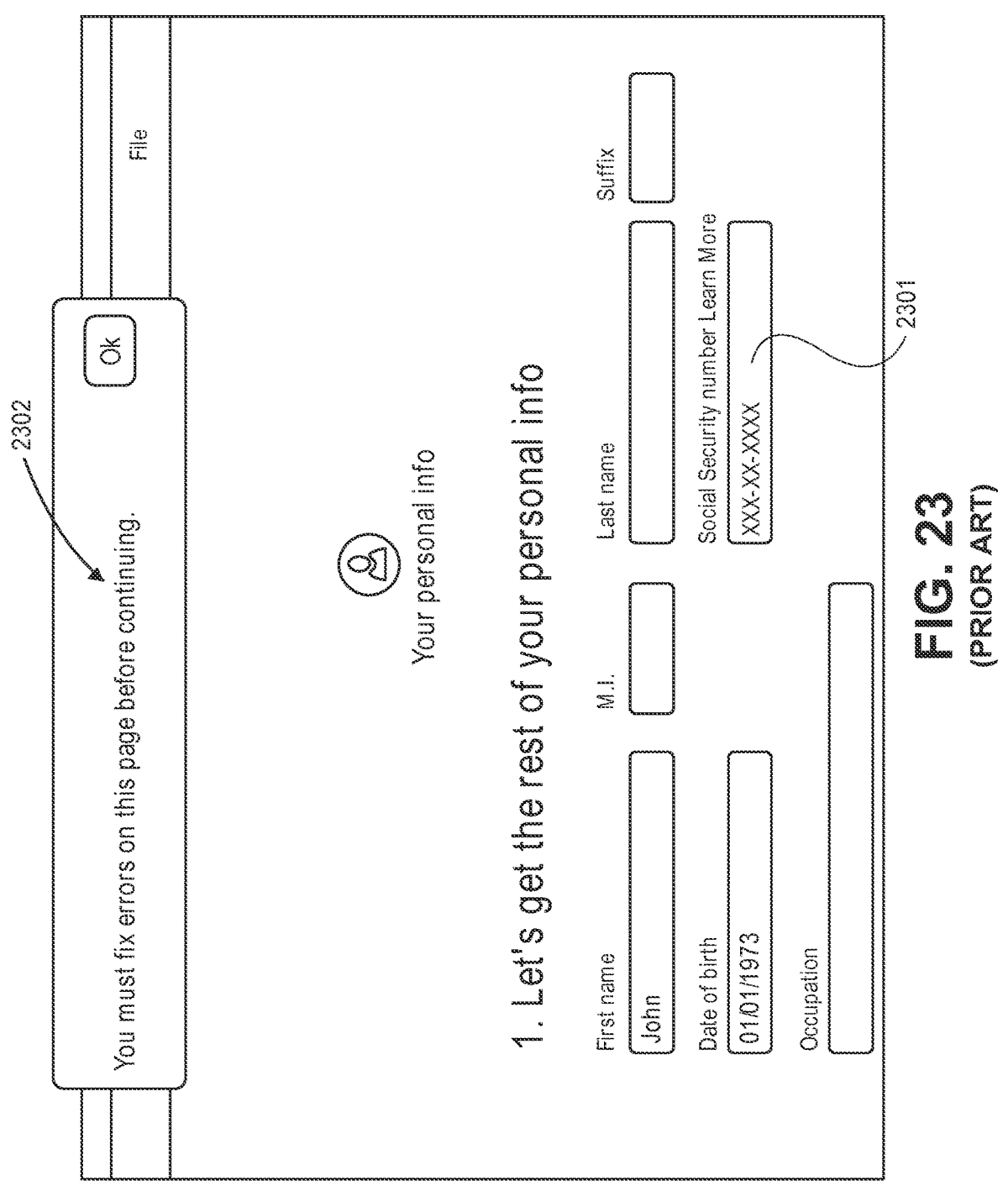

FIG. 23 generally illustrates certain components of a computing device 2300 that may be utilized to execute or that may embody components of embodiments. For example, the computing device may include a memory 2310, program instructions 2312, a processor or controller 2320 to execute instructions 2312, a network or communications interface 2330, e.g., for communications with a network or interconnect 2340 between such components. The memory 2310 may be or include one or more of cache, RAM, ROM, SRAM, DRAM, RDRAM, EEPROM and other types of volatile or non-volatile memory capable of storing data. The processor unit 2320 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 2340 may include a system bus, LDT, PCI, ISA, or other types of buses, and the communications or network interface may, for example, be an Ethernet interface, a Frame Relay interface, or other interface. The network interface 2330 may be configured to enable a system component to communicate with other system components across a network which may be a wireless or various other networks. It should be noted that one or more components of computing device 2300 may be located remotely and accessed via a network. Accordingly, the system configuration provided in FIG. 23 is provided to generally illustrate how embodiments may be configured and implemented, and it will be understood that embodiments may also involve communications through one or more networks between a user computer and a computer hosting system embodiments of on-line or cloud based tax return preparation applications.

Method embodiments or certain steps thereof, some of which may be loaded on certain system components, computers or servers, and others of which may be loaded and executed on other system components, computers or servers, may also be embodied in, or readable from, a non-transitory, tangible medium or computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 2320 performs steps or executes program instructions 2312 within memory 2310 and/or embodied on the carrier to implement method embodiments.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

For example, while certain embodiments are described with reference to examples involving a user hesitating or declining to provide sensitive personal information such as SSN and DOB or similar data, it will be understood that embodiments may involve various other types of data which the user has not entered and indicated whether the unentered data is applicable to the user. Thus, while certain embodiments accommodate users that would prefer to not provide such information given the sensitive nature of the information until a later time or when an electronic tax return is to be finalized and filed, there are various other reasons why data may not be entered but the user indicates that the data or topic is applicable to the user. For example, the user may not remember the requested data, or may not have access to the requested data since the user may not have a tax document including the requested data.

Further, while certain embodiments have been described with reference to a placeholder and different forms thereof, such placeholder data may be generated in response to user input, or selected from a pre-determined set of placeholder data maintained in placeholder database.

Additionally, it will be understood that when data was not entered previously is subsequently provided, it may or may not be necessary for the calculation engine and tax logic agent to repeat tax calculations and logic determinations. For example, if a pseudo SSN of 555-55-5555 was a placeholder generated or selected in response to a user declining to provide the user's SSN, tax calculations and logic determinations based on the user having a SSN would not need to be repeated since replacing the pseudo SSN with the user's actual SSN would yield the same results. On the other hand, if the user did not provide a date of birth of a child, the temporary data engine may generate or select a placeholder indicating that the taxpayer has a child, and, for example, using statistics or a predictive model, estimate that the child is 17 years old. Tax calculations and logic determinations may be performed on this basis. However, when the user enters the child's date of birth, it is determined that the child is 18 rather than 17, in which case tax calculations and logic determinations may have to be repeated given that different tax situations, e.g., whether the child can be claimed as a dependent, may apply to a 17 year old child compared to an 18 year old child.

Moreover, while embodiments are described with reference to a placeholder that may be in the form of pseudo or dummy data and/or a temporary data indicator, bit or tag, and whether such certain system components know that a placeholder is temporary for data that has not been entered but applies, it will be understood that a placeholder database may be utilized to record and track placeholder status for pseudo data, temporary data indicators, bits or tags, and when both pseudodata and temporary data indicators, bits or tags are utilized. Thus, for example, if temporary data indicators are utilized, the calculation engine and the tax logic agent may be aware of the status or that a certain type of data or topic applies even though the user has not provided the data, and a non-binding suggestion including such indicator will also notify the UI controller of this status, but the UI controller may also maintain a placeholder database as a further cross-check on such placeholders. For example, the tax logic agent may read runtime data including a temporary data indicator from shared data store but the UI controller subsequently writes an update to the shared data store with data provided by the user to fill in the previously unentered fields such that a non-binding suggestion for that same topic or question no longer applies and upon receiving such non-binding suggestion, it can be ignored since the placeholder database reflects the current placeholder status.

Additionally, while embodiments are described with reference to exemplary response options related to the applicability and/or status of the requested but unentered tax return data, it will be understood that various types and numbers of response options can be integrated into an interview screen, and that different reasons for not entering certain data may result in the same indication that the data or corresponding tax topic applies even though the data is not entered. For example, response options may involve "The requested data does not apply" (in which case a placeholder is not necessary), "The requested data applies to me but I don't have it now," "I have the requested data but prefer not to enter it now," "I will enter the requested data later." Further, according to certain embodiments, only selected types of information are provided with response options to indicate the status and/or applicability of certain data or topics such as personal identification data or data that taxpayers consider to be sensitive data or are more likely to be reluctant to provide.

Further, where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process as well as performed sequentially. Thus, the methods shown in various flow diagrams are not intended to be limited to a particular sequential order, unless otherwise stated or required.

Accordingly, embodiments are intended to exemplify alternatives, modifications, and equivalents that may fall within the scope of the claims.

What is claimed is:

1. A tax return preparation system executable by one or more processors of one or more computing devices and operable to prepare an electronic tax return, the system comprising:
 a user interface controller configured or operable to present an interview screen to a user of the computerized tax preparation system, the interview screen including a request for data for the electronic tax return being prepared, and to receive a response to the request from the user through the interview screen, the user's response indicating that at least a portion of the requested data includes data that applies to the user and was not entered by the user;
 a data store in communication with the user interface controller and comprising runtime data of the electronic tax return;
 a temporary data engine associated with the user interface controller and configured or programmed to generate a placeholder for the requested data that was not entered based at least in part upon the user's response and to write the placeholder to the shared data store, the placeholder including pseudodata generated by the temporary data engine suitable for facilitating determination of a result of a function executed using the runtime data;

a calculation engine configured to:
read the runtime data including the placeholder from the data store;
execute a function utilizing the runtime data including the placeholder and its pseudodata;
determine a result of the function, the result being dependent upon the pseudodata included in the placeholder; and
write the determined result to the data store to update the runtime data; and a computerized tax logic agent configured or programmed to read the runtime data as updated by the user interface controller and the calculation engine from the shared data store, perform analysis of rules based at least in part upon the updated runtime data, and generate a non-binding suggestion of an unanswered question or topic for consideration by the user interface controller, wherein generation of interview screens by the user interface controller and rule analysis by the computerized tax logic agent are independent of each other.

2. The system of claim 1,
wherein pseudodata is in the same format as that of the requested data that was not entered.

3. The system of claim 1, the requested data that was not entered comprising personal identification data, and the pseudodata comprising pre-determined personal identification data.

4. The system of claim 3, the personal identification data comprising a social security number, and the pseudodata comprising a pre-determined social security number.

5. The system of claim 3,
wherein the pre-determined personal identification data is utilized as pseudodata for other users of the tax return preparation system.

6. The system of claim 1, the temporary data engine being configured or programmed to write the pseudodata to the data store without an indicator that the pseudodata is temporary data that represents requested data that was not entered.

7. The system of claim 6, the calculation engine being configured or programmed to read the runtime data including the pseudodata from the data store and write the determined result to the data store to update the runtime data of the data store, wherein the calculation engine is not aware that the pseudodata is temporary data that represents requested data that was not entered.

8. The system of claim 6, the computerized tax logic agent being configured or programmed to read the runtime data including the placeholder and its pseudodata from the data store, wherein the non-binding suggestion is based at least in part upon the placeholder and its pseudodata and the computerized tax logic agent is not aware that the pseudodata is temporary data that represents requested data that was not entered.

9. The system of claim 1, the placeholder further comprising an indicator that the pseudodata is temporary data generated or selected by the temporary data engine that represents requested data that was not entered, the temporary data engine being configured to write the pseudodata and the indicator to the data store.

10. The system of claim 9,
wherein the pseudodata is in a format that is different compared to a format of the indicator.

11. The system of claim 9, the indicator comprising a binary bit or a flag indicating that the requested data that was not entered is applicable to the user.

12. The system of claim 9, the calculation engine being configured or programmed to read the pseudodata and the indicator from the data store and write the determined result to the data store to update the runtime data of the data store, wherein the determined result is tagged by the calculation engine to include the indicator and written to the data store to update the runtime data.

13. The system of claim 9, the computerized tax logic agent being configured or programmed to read the pseudodata and the indicator from the data store and generate the non-binding suggestion based at least in part upon the pseudodata and the indicator.

14. The system of claim 1, the placeholder comprising an indicator that the pseudodata is temporary data.

15. The system of claim 14,
wherein the indicator is in a format that is different compared to a format as that of the requested data that was not entered.

16. The system of claim 15, the indicator comprising a binary bit or a flag indicating that the requested data that was not entered is applicable to the user.

17. The system of claim 14, the calculation engine being configured or programmed to read the indicator from the data store and write the determined result to the data store to update the runtime data of the data store, wherein the determined result is tagged by the calculation engine to include the indicator and written to the data store to update the runtime data.

18. The system of claim 14, the computerized tax logic agent being configured or programmed to read the indicator from the data store and generate the non-binding suggestion based at least in part upon the indicator.

19. The system of claim 14, the non-binding suggestion including the indicator or data that the non-binding suggestion is based at least in part upon the indicator.

20. The system of claim 1, further comprising the temporary data engine predicting other tax data of the user's electronic tax return based at least in part upon the placeholder.

21. The system of claim 20, the temporary data engine being configured or programmed to tag the predicted data with an indicator that the predicted data is based on the placeholder.

22. The system of claim 20,
wherein the result generated by the calculation engine and the non-binding suggestion generated by the computerized tax logic agent are based at least in part upon the placeholder and the predicted data.

23. The system of claim 1,
wherein the temporary data engine is a component of the user interface controller.

24. The system of claim 1, the tax return preparation system comprising a distributed tax return preparation system in which the user interface controller, the data store, the calculation engine and the computerized tax logic agent are hosted by respective computers, and the data store computer is in communication with the user interface controller computer, the calculation engine computer and the computerized tax logic agent computer through respective networks.

25. The system of claim 1, the function utilized by the calculation engine being part of a graphical data structure comprising a directed calculation graph including encoded data dependencies amongst tax concepts or topics.

26. The system of claim 25, the directed calculation graph comprising a plurality of nodes comprising:
- input or leaf nodes comprising data for specific tax-related items;
- tax function nodes associated with respective tax functions, wherein respective input nodes are associated with respective tax function nodes, and inputs to a tax function include data of respective associated input nodes; and
- result nodes associated with respective tax functions nodes, a result node comprising an output generated by execution of a tax function associated with a tax function node.

27. The system of claim 1, the computerized tax logic agent configured or programmed to read the runtime data as updated by the user interface controller and the calculation engine from the shared data store and perform an analysis of rules based at least in part upon the runtime data and a directed completeness graph.

28. The system of claim 27, the directed completeness graph indicating when the electronic tax return is a fileable tax return.

29. The system of claim 1, the user interface controller tracking placeholders for requested data that was not entered and determining whether an additional requests should be presented to the user for the data independently of a non-binding suggestion generated by the computerized tax logic agent.

30. The system of claim 29, the user interface controller presenting the interview screen including the second request in response to receiving a non-binding suggestion with an indicator that the non-binding suggestion was based least in part upon the placeholder.

31. The system of claim 1,
wherein the user's response is a result of the user withholding the requested data.

32. The system of claim 1,
wherein the user's response is a result of the user not knowing the requested data.

33. The system of claim 1,
wherein the user's response is a result of the user not having a tax document with the requested data.

\* \* \* \* \*